(12) United States Patent
Ohsaku

(10) Patent No.: US 6,366,841 B1
(45) Date of Patent: Apr. 2, 2002

(54) DAMPING FORCE CONTROL DEVICE AND METHOD

(75) Inventor: Satoru Ohsaku, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/551,647

(22) Filed: Apr. 18, 2000

(30) Foreign Application Priority Data

Apr. 20, 1999 (JP) ............................................ 11-112865

(51) Int. Cl.$^7$ ............................................... B60G 23/00
(52) U.S. Cl. ......................... 701/37; 280/5.5; 280/5.515
(58) Field of Search .............................. 701/37, 38, 39; 280/5.5, 5.507, 5.515; 248/550

(56) References Cited

U.S. PATENT DOCUMENTS

| | | | | |
|---|---|---|---|---|
| 4,898,257 A | * | 2/1990 | Brandstadter | 180/9.1 |
| 5,839,082 A | * | 11/1998 | Iwasaki | 701/38 |
| 6,067,491 A | * | 5/2000 | Takahashi | 701/37 |
| 6,073,066 A | * | 6/2000 | Takahashi | 701/37 |
| 6,092,011 A | * | 7/2000 | Hiramoto | 701/37 |

FOREIGN PATENT DOCUMENTS

| | | |
|---|---|---|
| JP | A-5-294122 | 11/1993 |
| JP | A-6-344743 | 12/1994 |

\* cited by examiner

*Primary Examiner*—Gertrude Arthur
(74) *Attorney, Agent, or Firm*—Oliff & Berridge PLC

(57) ABSTRACT

A damping force control device and method controls damping forces of dampers at locations of respective wheels. A first target damping force that inhibits vibrations of a vehicle body in the heave direction is calculated for each of the wheels, based on a single wheel model of the vehicle which employs the skyhook theory. A second target damping force that inhibits vibrations of the vehicle body in the pitch direction is calculated for each of the wheels, based on a model of front and rear wheels of the vehicle. A third target damping force that inhibits vibrations of the vehicle body in the roll direction is calculated for each of the wheels, based on a model of left and right wheels of the vehicle. One of the first through third target damping forces that has the greatest absolute value is selected for each of the wheels. The damping force exerted by the damper at the location of each wheel is set to the selected target damping force. Such a damping force control device inhibits the vehicle from making pitch or roll movements without damaging the control performance for attenuating vertical vibrations of the vehicle body.

20 Claims, 17 Drawing Sheets

DAMPING FORCE CONTROL DEVICE AND METHOD

INCORPORATION BY REFERENCE

The disclosure of Japanese Patent Application No. HEI 11-12865 filed on Apr. 20, 1999 including the specification, drawings and abstract is incorporated herein by reference in its entirety.

BACKGROUND OF THE INVENTION

1. Field of Invention

The invention relates to a damping force control device and a damping force control method for controlling damping forces of dampers disposed between a vehicle body and respective wheels of a vehicle.

2. Description of Related Art

As a first related art of this kind, there is known a damping force control device which determines an actual damping coefficient based on the skyhook theory, that is, in accordance with a ratio between a vertical speed of the vehicle body and a vertical speed of the vehicle body relative to a wheel (e.g. Japanese Patent Application Laid-Open No. HEI 5-294122). This device is designed to decompose a vertical speed of the vehicle body at the location of each wheel into a roll movement speed, a pitch movement speed, a heave movement speed and a warp movement speed of the vehicle body. The pitch movement speed is multiplied by a pitch gain which changes in accordance with a differential value of a longitudinal acceleration. The roll movement speed is multiplied by a roll gain which changes in accordance with a differential value of a lateral acceleration. The heave and warp movement speeds are multiplied by constant gains respectively. The roll movement speed, the pitch movement speed, the heave movement speed and the warp movement speed that have thus been gain-adjusted are re-synthesized into a vertical speed of the vehicle body at the location of each of the wheels. The actual damping coefficient is determined according to a ratio between the re-synthesized vertical speed of the vehicle body at the location of each of the wheels and a speed of the vehicle body at the location of the wheel relative to the wheel. Thus the vehicle body at the location of each of the wheels is inhibited from vibrating vertically, and is effectively inhibited from making pitch or roll movements.

According to a second related art, an amount of vertical displacement of the vehicle body at the location of each of the wheels relative to the wheel is detected. Based on various equations of motion which consider pitch and roll movements of the vehicle body and the like, a vertical speed of the vehicle body at the location of each of the wheels is calculated by means of the aforementioned amount of relative displacement. By differentiating the aforementioned amount of relative displacement, a vertical speed of the vehicle body at the location of each of the wheels relative to the wheel is calculated. The actual damping coefficient is determined according to a ratio between the vertical speed and the relative speed for each of the wheels. In short, there is also known a damping force control device for controlling damping forces of the dampers based on the skyhook theory, by merely detecting the amount of relative displacement as mentioned above (Japanese Patent Application Laid-Open No. HEI 6-344743).

However, according to the aforementioned first and second related art, the algorithm for performing control to inhibit vertical vibrations of the vehicle body, namely, the algorithm based on the skyhook theory is directly corrected in accordance with pitch and roll movements of the vehicle body. Although the effect of inhibiting the vehicle body from vibrating in the pitch and roll directions can be accomplished through such correction, the basic performance of the damping force control for inhibiting vertical vibrations of the vehicle body is adversely affected.

SUMMARY OF THE INVENTION

The invention has been made with the aim of solving the above-stated problem. It is an object of the invention to provide a damping force control device and a damping force control method which, while ensuring the control performance for inhibiting vertical vibrations of a vehicle body, also bring about the effect of inhibiting the vehicle body from making pitch and/or roll movements.

In order to solve the aforementioned problem, a damping force control device according to a first aspect of the invention is provided with a controller that calculates, for each of the wheels, a first target damping force that inhibits vibrations of the vehicle body in a heave direction based on a single wheel model of the vehicle; calculates, for each of the wheels, a second target damping force that inhibits vibrations of the vehicle body in a pitch direction based on a model of front and rear wheels of the vehicle; determines an ultimate target damping force for each of the wheels based on the calculated first and second target damping forces; outputs a control signal corresponding to the determined ultimate target damping force to each of the dampers; and controls each damper such that a damping force exerted by each of the dampers is set to the determined ultimate target damping force.

In this case, for example, the controller calculates the first target damping force in accordance with a kinetic state quantity of the vehicle body in the lateral direction and the second target damping force in accordance with a kinetic state quantity of the vehicle body in pitch direction.

According to the first aspect of the invention, the controller calculates the first and second target damping forces, respectively. Through operations of the controller, control is performed such that a damping force exerted by each of the dampers is set to the determined ultimate target damping force for each of the wheels. In this case, the first target damping force is calculated to inhibit vibrations of the vehicle body in the heave direction, based on the single wheel model of the vehicle. The second target damping force is calculated, independently of the first target damping force, to inhibit vibrations of the vehicle body in the pitch direction, based on the model of front and rear wheels of the vehicle. Therefore, while the control performance intrinsic in the first target damping force that inhibits vertical vibrations of the vehicle body is ensured, a deficiency in damping force for pitch movements of the vehicle body is compensated for. Thus the vehicle body is effectively inhibited from vibrating vertically and also from making pitch movements. Consequently the vehicle achieves good riding comfort and high running stability.

In the aforementioned first aspect of the invention, the controller may be designed to determine the ultimate target damping force by selecting the greater one of the calculated first and second target damping forces for each of the wheels, and to output the selected control signal to each of the dampers and control each damper such that the damping force exerted by each of the dampers is set to the selected target damping force.

According to this aspect of the invention, control is performed such that the damping force of the damper for each of the wheels is set to the greater one of the first and second target damping forces. Thus, only if the magnitude of vibrations of the vehicle body in the pitch direction has increased to some extent, on the condition that the first target damping force is smaller than the second target damping force, the damping force of the damper at the location of each of the wheels is set to the second target damping force to inhibit vibrations of the vehicle body in the pitch direction, based on the model of front and rear wheels of the vehicle. Otherwise, the damping force of the damper at the location of each of the wheels is set to the first target damping force to inhibit vibrations of the vehicle body in the heave direction, based on the single wheel model of the vehicle. Accordingly, according to this aspect, while the control performance for inhibiting vertical vibrations of the vehicle body, which is intrinsic in the first target damping force calculated by the controller, is ensured more suitably, a deficiency in damping force for pitch movements of the vehicle body is compensated for. Thus the vehicle body is more effectively inhibited from vibrating vertically and also from making pitch movements. Consequently the vehicle achieves better riding comfort and higher running stability.

In a second aspect of the invention, the controller calculates, for each of the wheels, a second target damping force that inhibits vibrations of the vehicle body in a roll direction, based on a model of left and right wheels of the vehicle. In this case, for example, the controller calculates the second target damping force in accordance with a kinetic state quantity of the vehicle body in the roll direction.

In the second aspect of the invention, the second target damping force that inhibits vibrations of the vehicle body in the pitch direction in the first aspect of the invention is replaced by the second target damping force that inhibits vibrations of the vehicle body in the roll direction. Therefore, while the control performance for inhibiting vertical vibrations of the vehicle body, which is intrinsic in the first target damping force, is ensured, a deficiency in damping force for roll movements of the vehicle body is compensated for. Thus the vehicle body is effectively inhibited from vibrating vertically and also from making roll movements. Consequently the vehicle achieves good riding comfort and high running stability.

Furthermore, in a third aspect of the invention, the controller calculates a third target damping force. The controller determines an ultimate target damping force for each of the wheels, based on the calculated first, second and third target damping forces. Also in this case, the controller selects the greatest one of the calculated first, second and third target damping forces for each of the wheels, and outputs a control signal corresponding to the selected target damping force to each of the dampers and controls each damper such that the damping force exerted by each of the dampers is set to the selected target damping force.

In the third aspect of the invention, instead of the first and second target damping forces in the first and second aspects of the invention, the damping force exerted by the damper is so controlled as to be set to a target damping force that has been determined based on the independently calculated first through third target damping forces, for example, to the greatest one of the first, second and third target damping forces. In this case, the first target damping force is calculated to inhibit vibrations of the vehicle body in the heave direction, based on the single wheel model of the vehicle. The second target damping force is calculated to inhibit vibrations of the vehicle body in the pitch direction, based on the model of front and rear wheels of the vehicle. The third target damping force is calculated to inhibit vibrations of the vehicle body in the roll direction, based on the model of left and right wheels of the vehicle. These first through third target damping forces are calculated independently of one another. Hence, according to the third aspect of the invention, while the control performance for inhibiting vertical vibrations of the vehicle body, which is intrinsic in the first target damping force calculated by the controller, is ensured, deficiencies in damping force for pitch and roll movements of the vehicle body are compensated for. Therefore the vehicle body is effectively inhibited from vibrating vertically and also from making pitch or roll movements. Consequently the vehicle achieves good riding comfort and high running stability.

According to a damping force control method of a fourth aspect of the invention, a first target damping force that inhibits vibrations of the vehicle body in a heave direction is calculated for each of the wheels based on a single wheel model of the vehicle, and a second target damping force that inhibits vibrations of the vehicle body in a pitch direction is calculated for each of the wheels based on a model of front and rear wheels of the vehicle. An ultimate target damping force is then determined for each of the wheels, based on the calculated first and second target damping forces. A control signal corresponding to the determined ultimate target damping force is then outputted to each of the dampers, and each damper is controlled such that a damping force exerted by each of the dampers is set to the determined ultimate target damping force.

In a fifth aspect of the invention, instead of calculating the second target damping force that inhibits vibrations of the vehicle body in the pitch direction as in the damping force control method of the fourth aspect of the invention, a second target damping force that inhibits vibrations of the vehicle body in the roll direction is calculated for each of the wheels. An ultimate target damping force is determined for each of the wheels, based on the aforementioned first and second target damping forces calculated for each of the wheels.

Furthermore, according to a damping force control method of a sixth aspect of the invention, a first target damping force that inhibits vibrations of the vehicle body in a heave direction, a second target damping force that inhibits vibrations of the vehicle body in a pitch direction, and a third target damping force that inhibits vibrations of the vehicle body in a roll direction are calculated for each of the wheels. An ultimate target damping force is then determined for each of the wheels, based on the calculated first, second and third target damping forces.

Definitions of vibrations of the vehicle body in the heave, pitch and roll directions will be given hereinafter. It is assumed herein that X-axis represents the longitudinal direction of the vehicle body, that Y-axis represents the lateral direction of the vehicle body, and that Z-axis represents the vertical direction of the vehicle body. The vibrations of the vehicle body in the heave direction refer to proper vibrations of the vehicle body moving parallel to the Z-axis. The vibrations of the vehicle body in the pitch direction refer to proper vibrations of the vehicle body rotating around the Y-axis. The vibrations of the vehicle body in the roll direction refer to proper vibrations of the vehicle body rotating around the X-axis.

BRIEF DESCRIPTION OF THE DRAWINGS

The foregoing and further objects, features and advantages of the invention will become apparent from the following description of preferred embodiments with reference to the accompanying drawings, wherein.

DETAILED DESCRIPTION OF PREFERRED EMBODIMENTS

Figure 1:
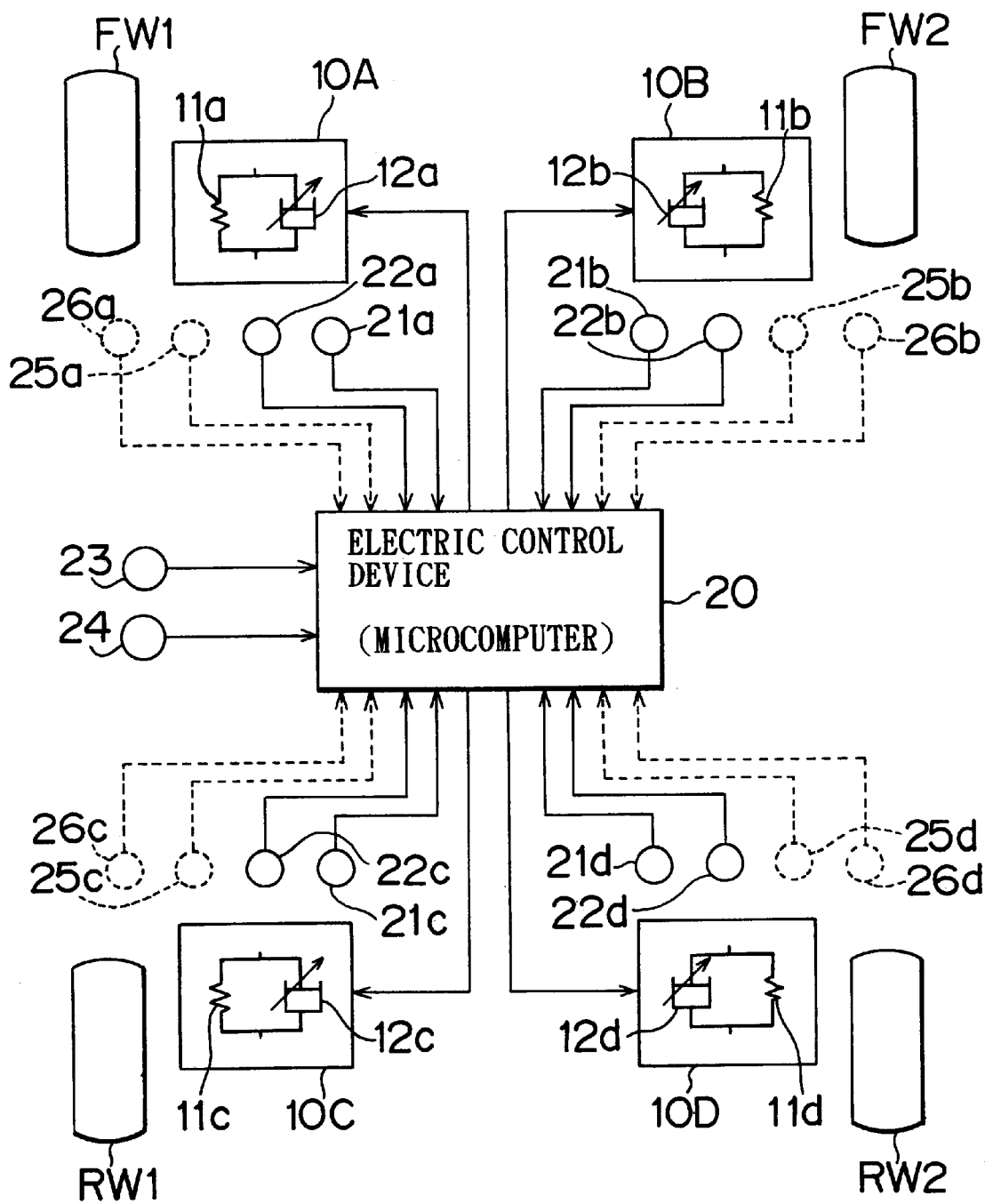
FIG. 1 is a schematic block diagram of a damping force control device for a vehicle.

Embodiments of the invention will be described hereinafter with reference to the drawings. FIG. 1 is a schematic block diagram showing a damping force control device for a vehicle according to the embodiments.

At locations of a front-left wheel FW1, a front-right wheel FW2, a rear-left wheel RW1 and a rear-right wheel RW2 of this vehicle, suspension systems 10A, 10B, 10C and 10D are disposed between a vehicle body BD (shown in FIGS. 4, 6 and 8) and the wheels FW1, FW2, RW1 and RW2 respectively. These suspension systems 10A, 10B, 10C and 10D, which are disposed between the vehicle body BD and the wheels FW1, FW2, RW1 and RW2 respectively, are provided with springs 11a, 11b, 11c and 11d and dampers 12a, 12b, 12c and 12d respectively. The springs 11a, 11b, 11c and 11d elastically support the vehicle body BD against the wheels FW1, FW2, RW1 and RW2 respectively. The dampers 12a, 12b, 12c and 12d are disposed in parallel with the springs 11a, 11b, 11c and 11d respectively and damp vibrations of the vehicle body BD with respect to the wheels FW1, FW2, RW1 and RW2 respectively. Each pair of the springs and dampers 11a and 12a, 11b and 12b, 11c and 12c, and 11d and 12d constitutes a shock absorber. The dampers 12a, 12b, 12c and 12d are designed to be able to control a damping coefficient by changing an orifice opening degree. This vehicle is also provided with an electric control device 20 for variably setting damping coefficients (damping forces) of the respective dampers 12a, 12b, 12c and 12d. The electric control device 20 is composed of a microcomputer, its marginal circuits and the like, and repeatedly executes a program shown in FIG. 2 (including sub-routines in FIGS. 3, 5 and 7) at intervals of a predetermined period of time by means of a built-in timer, thus controlling orifice opening degrees of the respective dampers 12a, 12b, 12c and 12d. Sprung mass acceleration sensors 21a through 21d, relative displacement amount sensors 22a through 22d, a pitch angular velocity sensor 23 and a roll angular velocity sensor 24 are connected to the electric control device 20.

The sprung mass acceleration sensors 21a through 21d, which are mounted to the vehicle body BD (the sprung member) at the locations of the wheels FW1, FW2, RW1 and RW2 respectively, detect vertical accelerations $X_{pb1}''$, $X_{pb2}''$, $X_{pb3}''$ and $X_{pb4}''$ of the vehicle body BD relative to absolute space at the locations of FW2, RW1 and RW2 respectively, and output detection signals indicative of the vertical accelerations $X_{pb1}''$, $X_{pb2}''$, $X_{pb3}''$ and $X_{pb4}''$ respectively. The vertical accelerations $X_{pb1}''$, $X_{pb2}''$, $X_{pb3}''$ and $X_{pb4}''$ assume positive values when the vehicle body BD is accelerated upwards and assume negative values when the vehicle body BD is accelerated downwards. The relative displacement amount sensors 22a through 22d, which are mounted between the vehicle body BD (the sprung member) at the locations of the wheels FW1, FW2, RW1 and RW2 and the wheels FW1, FW2, RW1 and RW2 (unsprung members) respectively, detect amounts of vertical displacement $(X_{pw1}-X_{pb1})$, $(X_{pw2}-X_{pb2})$, $(X_{pw3}-X_{pb3})$ and $(X_{pw4}-X_{pb4})$ of the vehicle body BD at the locations of the wheels FW1, FW2, RW1 and RW2 relative to the wheels FW1, FW2, RW1 and RW2 respectively, and output detection signals indicative of the amounts of displacement $(X_{pw1}-X_{pb1})$, $(X_{pw2}-X_{pb2})$, $(X_{pw3}-X_{pb3})$ and $(X_{pw4}-X_{pb4})$ respectively. The amounts of relative displacement $(X_{pw1}-X_{pb1})$, $(X_{pw2}-X_{pb2})$, $(X_{pw3}-X_{pb3})$ and $(X_{pw4}-X_{pb4})$, which represent amounts of displacement with respect to a predetermined reference amount of displacement, assume positive values if they proceed in a decreasing direction (in which the dampers contract) and assume negative values if they proceed in an increasing direction (in which the dampers extend).

The pitch angular velocity sensor 23, which is composed of a rate sensor installed in the vicinity of the center of gravity of the vehicle body BD, detects a pitch angular velocity $P_a'$ of the vehicle body BD and outputs a detection signal indicative of the pitch angular velocity $P_a'$. The roll angular velocity sensor 24, which is composed of a rate sensor installed in the vicinity of the center of gravity of the vehicle body BD, detects a roll angular velocity $R_a'$ of the vehicle body BD and outputs a detection signal indicative of the roll angular velocity $R_a'$.

Next, it will be described how the thus-constructed vehicular damping force control device operates. After an ignition switch (not shown) has been turned on, the electric control device 20 starts repeatedly executing the program shown in FIG. 2 at intervals of a predetermined period of time. The execution of this program is started in step 100, and the first through third damping force calculating routines are executed in steps 102, 104 and 106 respectively.

Figure 3:
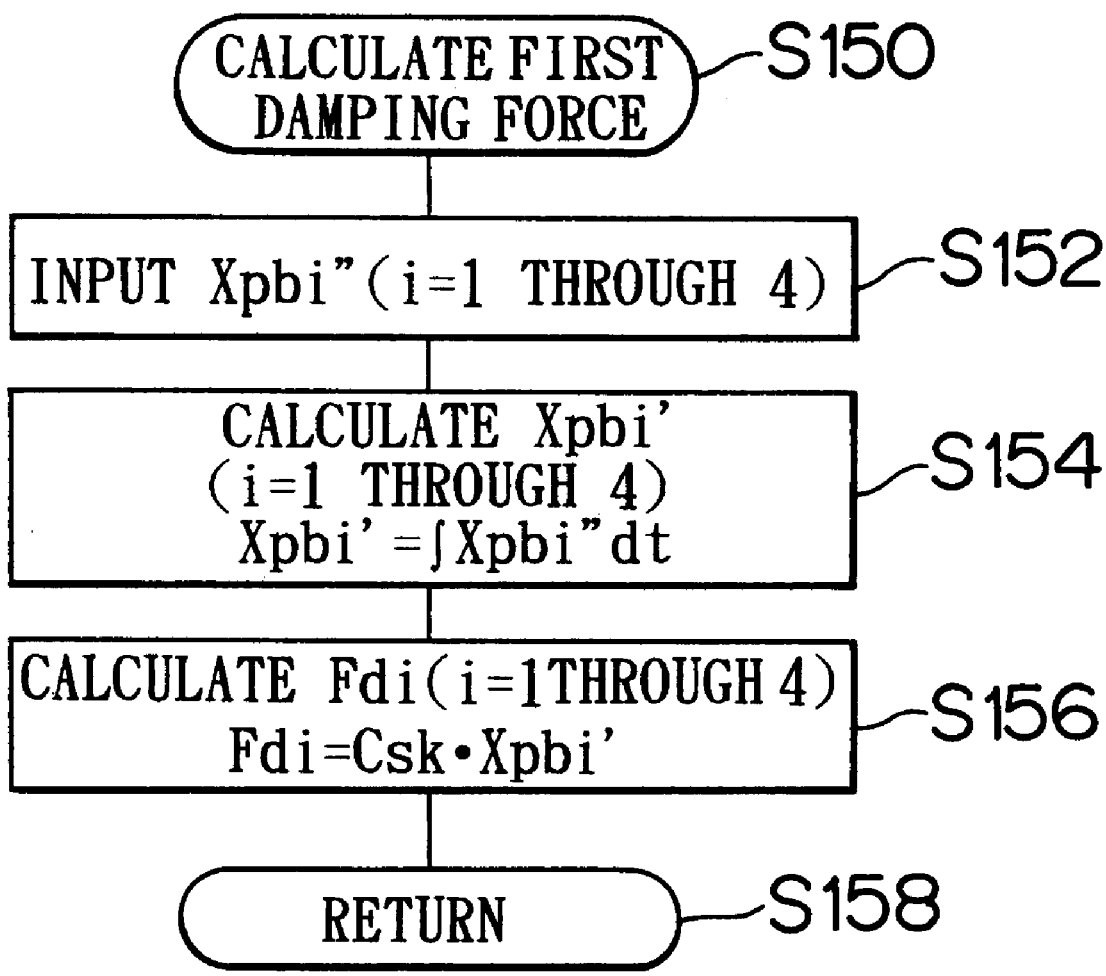
FIG. 3 is a detailed flowchart of a first damping force calculating routine shown in FIG. 2.

The first damping force calculating routine, which is shown in detail in FIG. 3, is intended to calculate a first target damping force exerted by each of the dampers 12a, 12b, 12c and 12d for inhibiting (vertical) vibrations of the vehicle body BD in the heave direction, based on a model of a single wheel of the vehicle.

Figure 4:
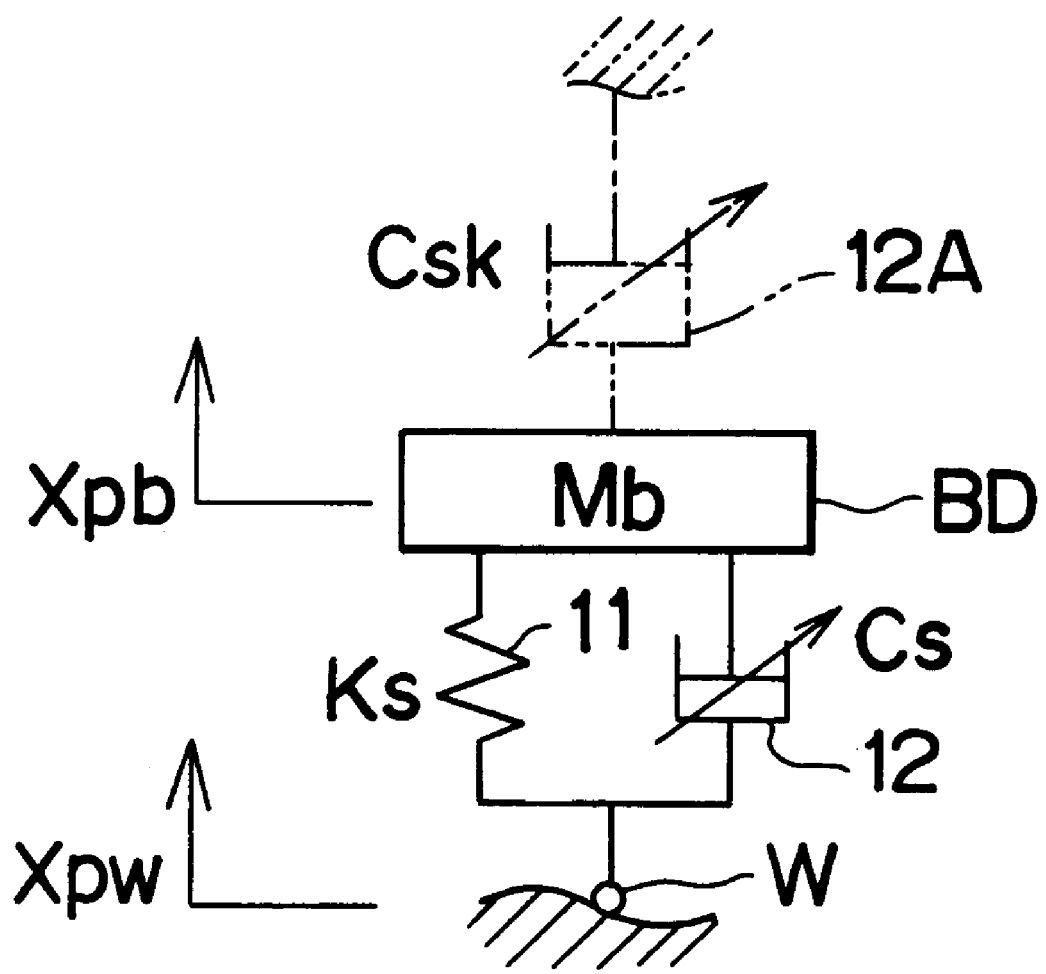
FIG. 4 is a model view of a single wheel of the vehicle.

Explanation of the first damping force calculating routine will be preceded by the description of how to calculate a first target damping force. FIG. 4 shows a model of a single wheel of the vehicle with one degree of freedom. Referring to FIG. 4, $M_b$ denotes a mass of the vehicle body BD. $X_{pb}$ denotes an amount of vertical displacement of the vehicle body BD (the sprung member) relative to a reference position in absolute space. $X_{pw}$ denotes an amount of vertical displacement of the wheel W (the unsprung member) relative to a reference position in absolute space. These amounts $X_{pb}$ and $X_{pw}$ of displacement assume positive values when the vehicle body BD and the wheel W move upwards respectively. Ks denotes a spring constant of a spring 11, which comprehensively represents the springs 11a, 11b, 11c and 11d. Cs denotes a damping coefficient of a damper 12, which comprehensively represents the dampers 12a, 12b, 12c and 12d. Csk denotes a damping coefficient of a virtual damper 12A that has been sky-hooked according to the skyhook theory and is a preliminarily determined constant of an appropriate value.

First of all, a virtual model employing the virtual damper 12A instead of the damper 12 will be considered. Given that $X_{pb}''$ denotes a vertical acceleration of the vehicle body BD and that $X_{pb}'$ denotes a vertical speed of the vehicle body BD, an equation of motion of the vehicle body BD in the heave direction of the virtual model is expressed by a formula (1) shown below.

$$MbX_{pb}'' = Ks(X_{px} - X_{pb}) - CskX_{pb}' \quad (1)$$

Considering an actual model employing the existing damper 12, an equation of vertical motion of the actual model is expressed by a formula (2) shown below.

$$MX_{pb}'' = Ks(X_p - X_{pb}) + Cs(X_{pw} - X_{pb})) \quad (2)$$

A formula (3) shown below is derived from the aforementioned formulas (1) and (2). In accordance with a relation defined by the formula (3), an ideal damping force Fd applied to the vehicle body BD by the damper 12 (or the damper 12A) based on the skyhook theory is expressed by a formula (4) shown below.

$$Cs(X_{pw}' - X_{pb}') + CskX_{pb}' = \quad (3)$$

$$Fd = Cs(X_{pw}' - X_{pb}') = -CskX_{pb} \quad (4)$$

Next the first damping force calculating routine will be described. The execution of the first damping force calculating routine is started in step 150 in FIG. 3. In step 152, vertical accelerations $X_{pb1}''$, $X_{pb2}''$, $X_{pb3}''$ and $X_{pb4}''$ of the vehicle body BD at the locations of the wheels FW1, FW2, RW1 and RW2 are inputted from the sprung mass acceleration sensors 21a through 21d respectively. Next in step 154, the inputted vertical accelerations $X_{pb1}''$, $X_{pb2}''$, $X_{pb3}''$ and $X_{pb4}''$ are integrated, whereby vertical speeds $X_{pb1}'$, $X_{pb2}'$, $X_{pb3}'$, and $X_{pb4}'$ of the vehicle body BD at the locations of the wheels FW1, FW2, RW1 and RW2 are calculated respectively.

Next in step 156, the calculated vertical speeds $X_{pb1}'$, $X_{pb2}'$, $X_{pb3}'$ and $X_{pb4}'$ are multiplied by the skyhook coefficient $C_{sk}$ that has appropriately been determined in advance through execution of a calculation expressed by a formula (5) shown below, whereby first target damping forces Fd1, Fd2, Fd3 and Fd4 exerted by the dampers 12a, 12b, 12c and 12d respectively are calculated.

$$Fdi = -C_{sk}X_{pbi}' \quad (5)$$

In the aforementioned formula (5), "i" denotes a positive integer from 1 to 4. In this example, although the skyhook coefficient $C_{sk}$ is commonly used for the wheels FW1, FW2, RW1 and RW2, the front wheels FW1 and FW2 may employ a skyhook coefficient different from that of the rear wheels RW1 and RW2. In step 158, the execution of the first damping force calculating routine is terminated.

Figure 5:
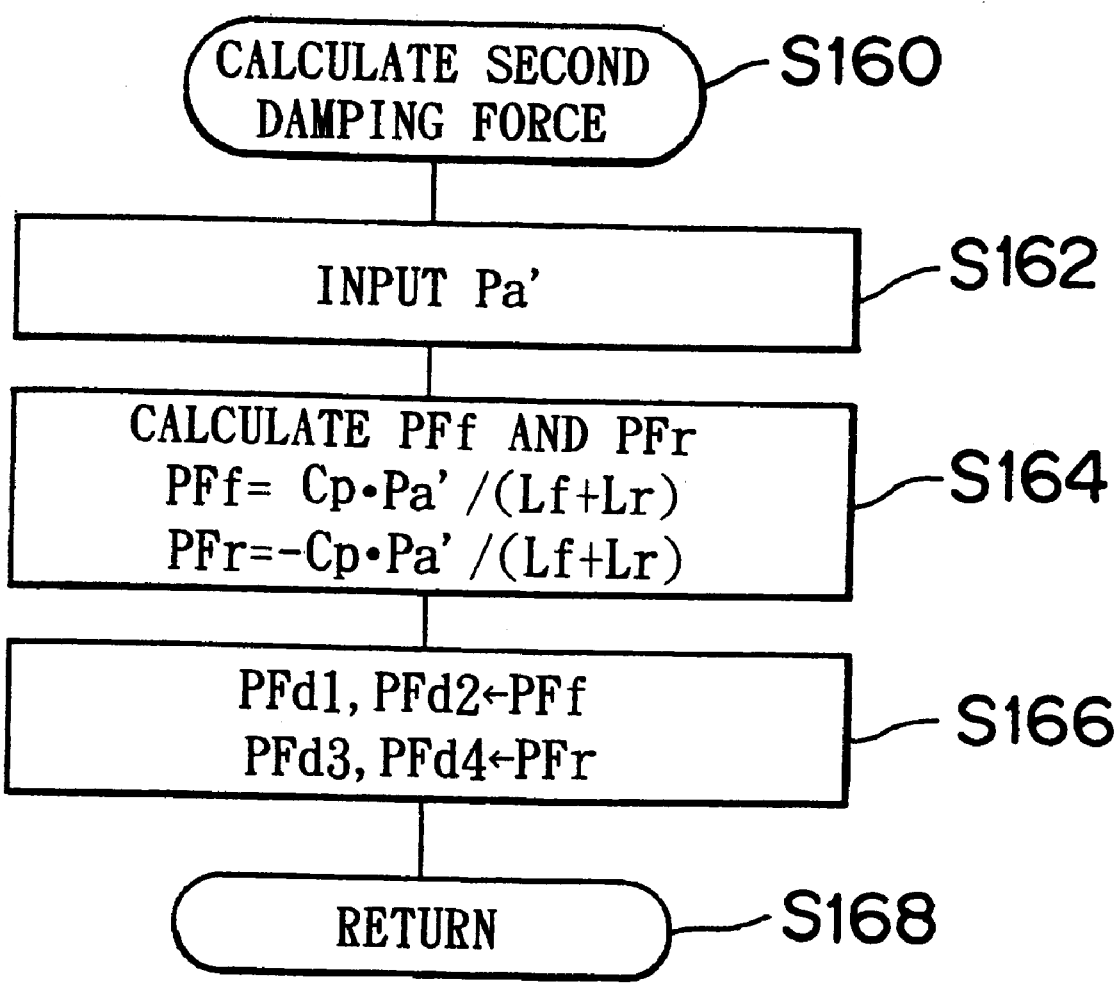
FIG. 5 is a detailed flowchart of a second damping force calculating routine shown in FIG. 2.

The second damping force calculating routine, which is shown in FIG. 5 in detail, is intended to calculate a second target damping force exerted by each of the dampers 12a, 12b, 12c and 12d for inhibiting vibrations of the vehicle body BD in the pitch direction, based on a model of front and rear wheels of the vehicle.

Figure 6:
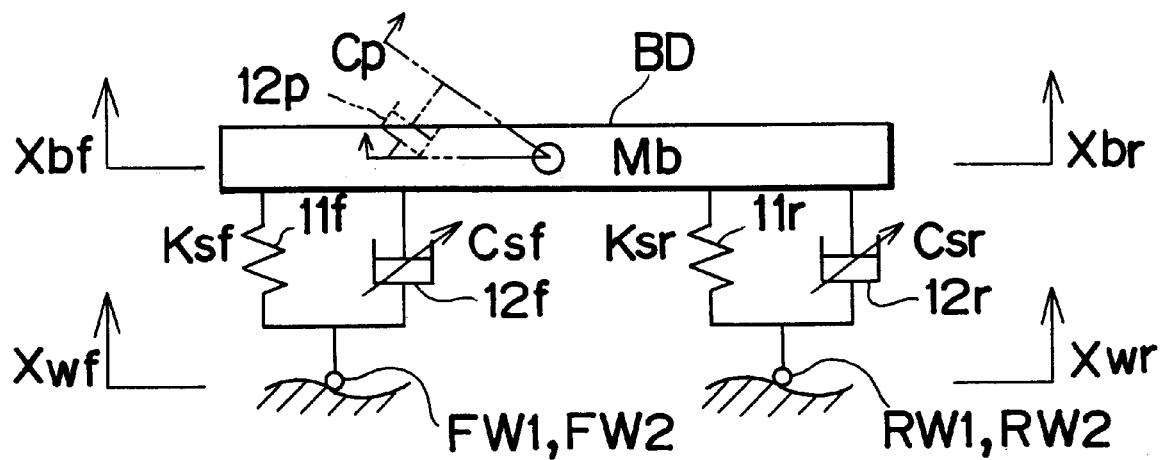
FIG. 6 is a model view of front and rear wheels of the vehicle.

Explanation of the second damping force calculating routine will be preceded by the description of how to calculate a second target damping force. FIG. 6 shows a model of front and rear wheels of the vehicle with two degrees of freedom. Referring to FIG. 6, $X_{bf}$ denotes an amount of vertical displacement of the vehicle body BD (the sprung member) at the locations of the front wheels FW1 and FW2 relative to a reference position. $X_{br}$ denotes an amount of vertical displacement of the vehicle body BD (the sprung member) at the locations of the rear wheels RW1 and RW2 relative to a reference position. $X_{wf}$ denotes an amount of vertical displacement of the front wheels FW1 and FW2 (the unsprung members) relative to a reference position. $X_{wr}$ denotes an amount of vertical displacement of the rear wheels RW1 and RW2 (the unsprung members) relative to a reference position. These amounts $X_{bf}$, $X_{wf}$, $X_{br}$ and $X_{wr}$ of displacement assume positive values when the vehicle body BD, the front wheels FW1 and FW2 and the rear wheels RW1 and RW2 move upwards respectively. $K_{sf}$ denotes a spring constant of a spring 11f, which comprehensively represents the springs 11a and 11b at the locations of the front wheels FW1 and FW2. $K_{sr}$ denotes a spring constant of a spring 11r, which comprehensively represents the springs 11c and 11d at the locations of the rear wheels RW1 and RW2. $C_{sf}$ denotes a damping coefficient of a damper 12f, which comprehensively represents the dampers 12a and 12b at the locations of the front wheels FW1 and FW2. $C_{sr}$ denotes a damping coefficient of a damper 12r, which comprehensively represents the dampers 12c and 12d at the locations of the rear wheels RW1 and RW2. Cp denotes a damping coefficient of a virtual damper 12p for damping vibrations of the vehicle body BD in the pitch direction and is a preliminarily determined constant of an appropriate value.

First of all, a virtual model employing the virtual damper 12p instead of the actual dampers 12f and 12r will be considered. Given that $X_{pb}''$ denotes a vertical acceleration of the vehicle body BD and that $P_a''$ and $P_a'$ denote an angular acceleration and an angular velocity of the vehicle body BD in the pitch direction respectively, equations of motion of the vehicle body BD in the heave and pitch directions of the virtual model are expressed respectively by formulas (6) and (7) shown below. The angular acceleration $P_a''$ and the angular velocity $P_a'$ assume positive values in a rotational direction in which the vehicle body BD rises on the side of the front wheels FW1 and FW2 and falls on the side of the rear wheels RW1 and RW2.

$$M_b X_{pb}'' = K_{sf}(X_{wf} - X_{bf}) + K_{sr}(X_{wr} - X_{br}) \qquad (6)$$

$$I_p P_a'' = -L_f K_{sf}(X_{wf} - X_{bf}) + L_r K_{sr}(X_{wr} - X_{br}) - C_p P_a' \qquad (7)$$

In the aforementioned formula (7), $I_p$ denotes a moment of inertia of the vehicle body BD in the pitch direction, $L_f$ a distance between a front axle and the center of gravity, and $L_r$ a distance between a rear axle and the center of gravity.

Considering an actual model employing the existing dampers 12f and 12r, equations of motion of the actual model in the heave and pitch directions are expressed respectively by formulas (8) and (9) shown below.

$$M_b X_{pb}'' = K_{sf}(X_{wf} - X_{bf}) + C_{sf}(X_{wf}' - X_{bf}') + K_{sr}(X_{wr} - X_{br}) + C_{sr}(X_{wr}' - X_{br}') \qquad (8)$$

$$I_p P_a'' = -L_f\{K_{sf}(X_{wf} - X_{bf}) + C_{sf}(X_{wf}' - X_{bf}')\} + L_r\{K_{sr}(X_{wr} - X_{br}) + C_{sr}(X_{wr}' - X_{br}')\} \qquad (9)$$

Formulas (10) and (11) shown below are derived from the aforementioned formulas (6) through (9).

$$C_{sf}(X_{wf}' - X_{bf}') + C_{sr}(X_{wr}' - X_{br}') = 0 \qquad (10)$$

$$L_f C_{sf}(X_{wf}' - X_{bf}') - L_r C_{sr}(X_{wr}' - X_{br}') + C_p P_a' = 0 \qquad (11)$$

In accordance with a relation defined by these formulas (10) and (11), ideal damping forces $PF_f$ and $PF_r$ applied to the vehicle body BD by the damper 12f for the front wheels and by the damper 12r for the rear wheels (or the damper 12p) for the purpose of damping vibrations of the vehicle body BD in the pitch direction are expressed respectively by formulas (12) and (13) shown below.

$$PF_f = C_{sf}(X_{wf}' - X_{bf}') = C_p P_a'/(L_f + L_r) \qquad (12)$$

$$PF_r = C_{sr}(X_{wr}' - X_{br}') = -C_p P_a'/(L_f + L_r) \qquad (13)$$

Next the second damping force calculating routine will be described. The execution of the second damping force calculating routine is started in step 160 in FIG. 5. In step 162, a pitch angular velocity $P_a'$ of the vehicle body BD is inputted from the pitch angular velocity sensor 23. Next in step 164, a target damping force $PF_f$ of the damper 12f for the front wheels and a target damping force $PF_r$ of the damper 12r for the rear wheels are calculated with a view to inhibiting vibrations of the vehicle body BD in the pitch direction, by making calculations according to aftermentioned formulas (14) and (15) respectively, wherein a damping coefficient $C_p$ which is ideal for inhibiting vibrations of the vehicle body BD in the pitch direction and has appropriately been determined in advance, the inputted pitch angular velocity $P_a'$, the predetermined distance $L_f$ between the front axle and the center of gravity, and the predetermined distance $L_r$ between the rear axle and the center of gravity are used.

$$PF_f = C_p P_a'/(L_f + L_r) \qquad (14)$$

$$PF_r = -C_p P_a'/(L_f + L_r) \qquad (15)$$

Next in step 166, the calculated target damping force $PF_f$ of the damper 12f for the front wheels is set as second target damping forces PFd1 and PFd2 for the front-left and front-right wheels FW1 and FW2 respectively, and the calculated target damping force $PF_r$ for the damper 12r for the rear wheels is set as second target damping forces PFd3 and PFd4 for the rear-right and rear-left wheels RW1 and RW2 respectively. In step 168, the execution of the second damping force calculating routine is terminated.

Figure 7:
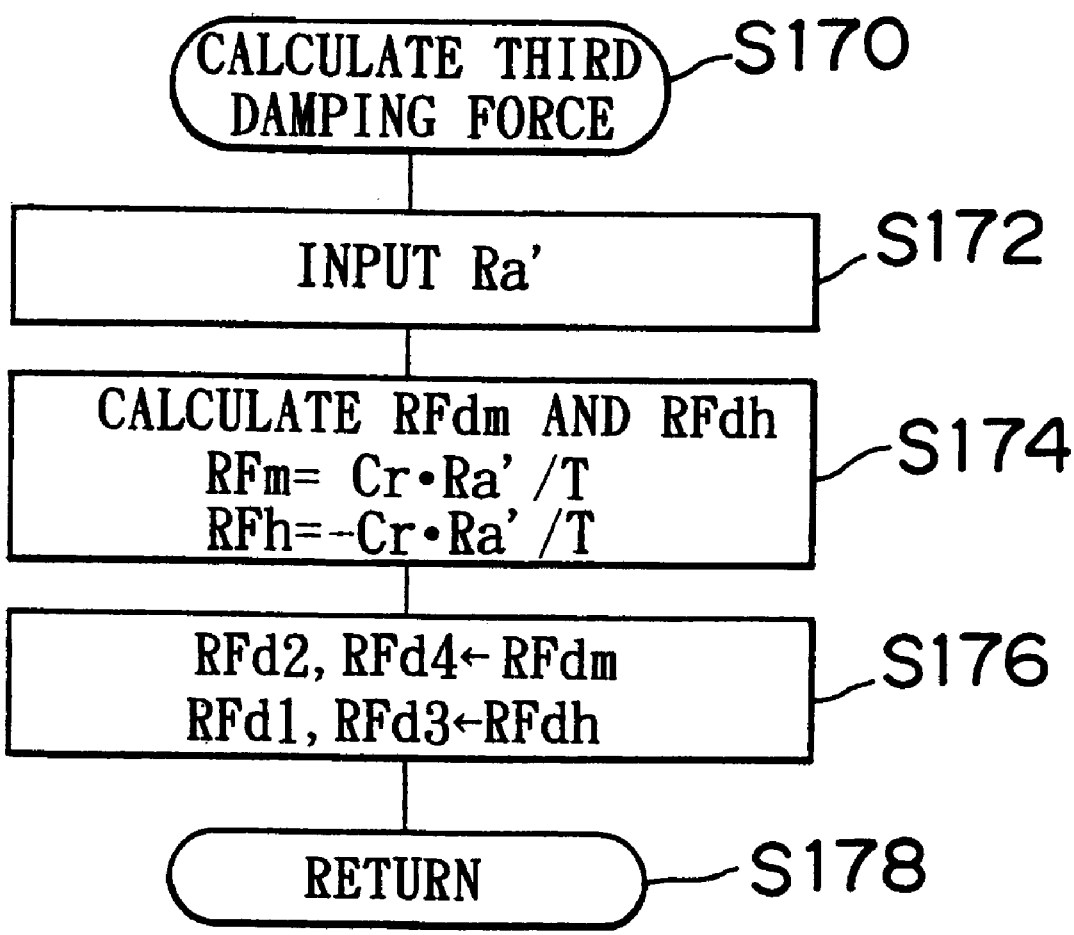
FIG. 7 is a detailed flowchart of a third damping force calculating routine shown FIG. 2.

The third damping force calculating routine, which is shown in FIG. 7 in detail, is intended to calculate a third target damping force exerted by each of the dampers 12a, 12b, 12c and 12d for inhibiting vibrations of the vehicle body BD in the roll direction, based on a model of left and right wheels of the vehicle.

Figure 8:
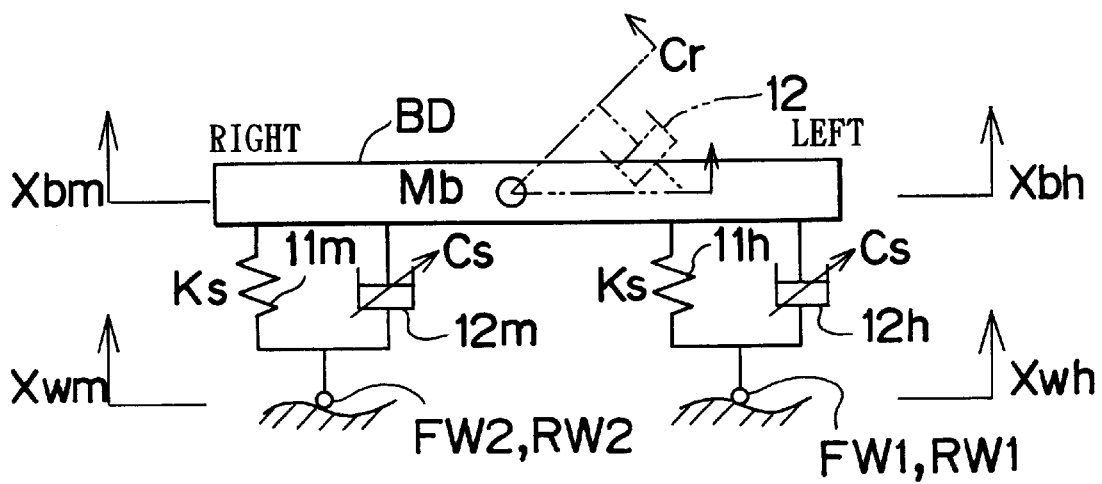
FIG. 8 is a model view of left and right wheels of the vehicle.

Explanation of the third damping force calculating routine will be preceded by the description of how to calculate a third target damping force. FIG. 8 shows a model of left and right wheels of the vehicle with two degrees of freedom. Referring to FIG. 8, $X_{bm}$ denotes an amount of vertical displacement of the vehicle body BD (the sprung member) at the locations of the right wheels FW2 and RW2 relative to a reference position. $X_{bh}$ denotes an amount of vertical displacement of the vehicle body BD (the sprung member) at the locations of the left wheels FW1 and RW1 relative to a reference position. $X_{wm}$ denotes an amount of vertical displacement of the right wheels FW2 and RW2 (the unsprung members) relative to a reference position. $X_{wh}$ denotes an amount of vertical displacement of the left wheels FW1 and RW1 (the unsprung members) relative to a reference position. These amounts $X_{bm}$, $X_{wm}$, $X_{bh}$ and $X_{wh}$ of displacement assume positive values when the vehicle body BD, the right wheels FW2 and RW2 and the left wheels FW1 and RW1 move upwards respectively. $K_s$ denotes a spring constant of a spring 11m, which comprehensively represents the springs 11b and 11d at the locations of the right wheels FW2 and RW2, and also denotes a spring constant of a spring 11h, which comprehensively represents the springs 11a and 11c at the locations of the left wheels FW1 and RW1. $C_s$ denotes a damping coefficient of a damper 12m, which comprehensively represents the dampers 12b and 12d at the locations of the right wheels FW2 and RW2, and also denotes a damping coefficient of a damper 12h, which comprehensively represents the dampers 12a and 12c at the locations of the left wheels FW1 and RW1. $C_r$ denotes a damping coefficient of a virtual damper 12r for damping vibrations of the vehicle body BD in the roll direction and is a preliminarily determined constant of an appropriate value.

First of all, a virtual model employing the virtual damper 12r instead of the dampers 12m and 12h will be considered. Given that $X_{pb}''$ denotes a vertical acceleration of the vehicle body BD and that $R_a''$ and $R_a'$ denote an angular acceleration and an angular velocity of the vehicle body BD in the roll direction respectively, equations of motion of the vehicle body BD in the heave and roll directions of the virtual model are expressed respectively by formulas (16) and (17) shown below. The angular acceleration $R_a''$ and the angular velocity $R_a'$ assume positive values in a rotational direction in which the vehicle body BD rises on the side of the left wheels FW1 and RW1 and falls on the side of the right wheels FW2 and RW2.

$$M_b X_{pb}'' = K_s(X_{wm} - X_{bm}) + K_s(X_{wh} - X_{bh}) \qquad (16)$$

$$I_r R_a'' = (K_s + K)(X_{wh} - X_{bh} - X_{wm} + X_{bm})T/2 - C_r R_a' \qquad (17)$$

In the aforementioned formula (17), $I_r$ denotes a moment of inertia of the vehicle body BD in the roll direction, K a spring constant of the stabilizer, and T a tread of the vehicle.

Considering an actual model employing the existing dampers 12m and 12h, equations of motion of the actual model in the heave and roll directions are expressed respectively by formulas (18) and (19) shown below.

$$M_b X_{pb}'' = K_s(X_{wm}-X_{bm}) + C_s(X_{wm}'-X_{bm}') + K_s(X_{wh}-X_{bh}) + C_s(X_{wh}'-X_{bh}') \quad (18)$$

$$I_r R_a'' = ((K_s+K)(X_{wh}-X_{bh}-X_{wm}+X_{bm}) + C_s(X_{wh}'-X_{bh}'-X_{wm}'+X_{bm}'))T/2 \quad (19)$$

Formulas (20) and (21) shown below are derived from the aforementioned formulas (16) through (19).

$$C_s(X_{wh}'-X_{bh}'+X_{wm}'-X_{bm}')=0 \quad (20)$$

$$C_s(X_{wh}'-X_{bh}'-X_{wm}'+X_{bm}')T/2 + C_r R_a' = 0 \quad (21)$$

In accordance with a relation defined by these formulas (20) and (21), ideal damping forces applied to the vehicle body BD by the damper 12m for the right wheels and the damper 12h for the left wheels (or the damper 12r) for the purpose of inhibiting vibrations of the vehicle body BD in the roll direction are expressed respectively by formulas (22) and (23) shown below.

$$RF_m = C_s(X_{wm}'-X_{bm}') = C_r R_a'/T \quad (22)$$

$$RF_h = C_s(X_{pwh}'-X_{pbh}') = -C_r R_a'/T \quad (23)$$

Next the third damping force calculating routine will be described. The execution of the third damping force calculating routine is started in step 170 in FIG. 7. In step 172, a roll angular velocity $R_a'$ of the vehicle body BD is inputted from the roll angular velocity sensor 24. Next in step 174, a target damping force $RF_m$ of the damper 12m for the right wheels and a target damping force $RF_h$ of the damper 12h for the left wheels are calculated with a view to inhibiting vibrations of the vehicle body BD in the roll direction, by making calculations according to after-mentioned formulas (24) and (25) respectively, wherein a damping coefficient $C_r$ which is ideal for inhibiting vibrations of the vehicle body BD in the roll direction and has appropriately been determined in advance, the inputted roll angular velocity $R_a'$, and the predetermined tread T are used.

$$RF_m = C_r R_a'/T \quad (24)$$

$$RF_h = C_r R_a'/T \quad (25)$$

Next in step 176, the calculated target damping force $RF_m$ of the damper $12_m$ for the right wheels is set as third target damping forces RFd2 and RFd4 for the right wheels FW2 and RW2 respectively, and the calculated target damping force $RF_h$ for the damper 12h for the left wheels is set as third target damping forces RFd1 and RFd3 for the left wheels FW1 and RW1 respectively. In step 178, the execution of the third damping force calculating routine is terminated.

Figure 2:
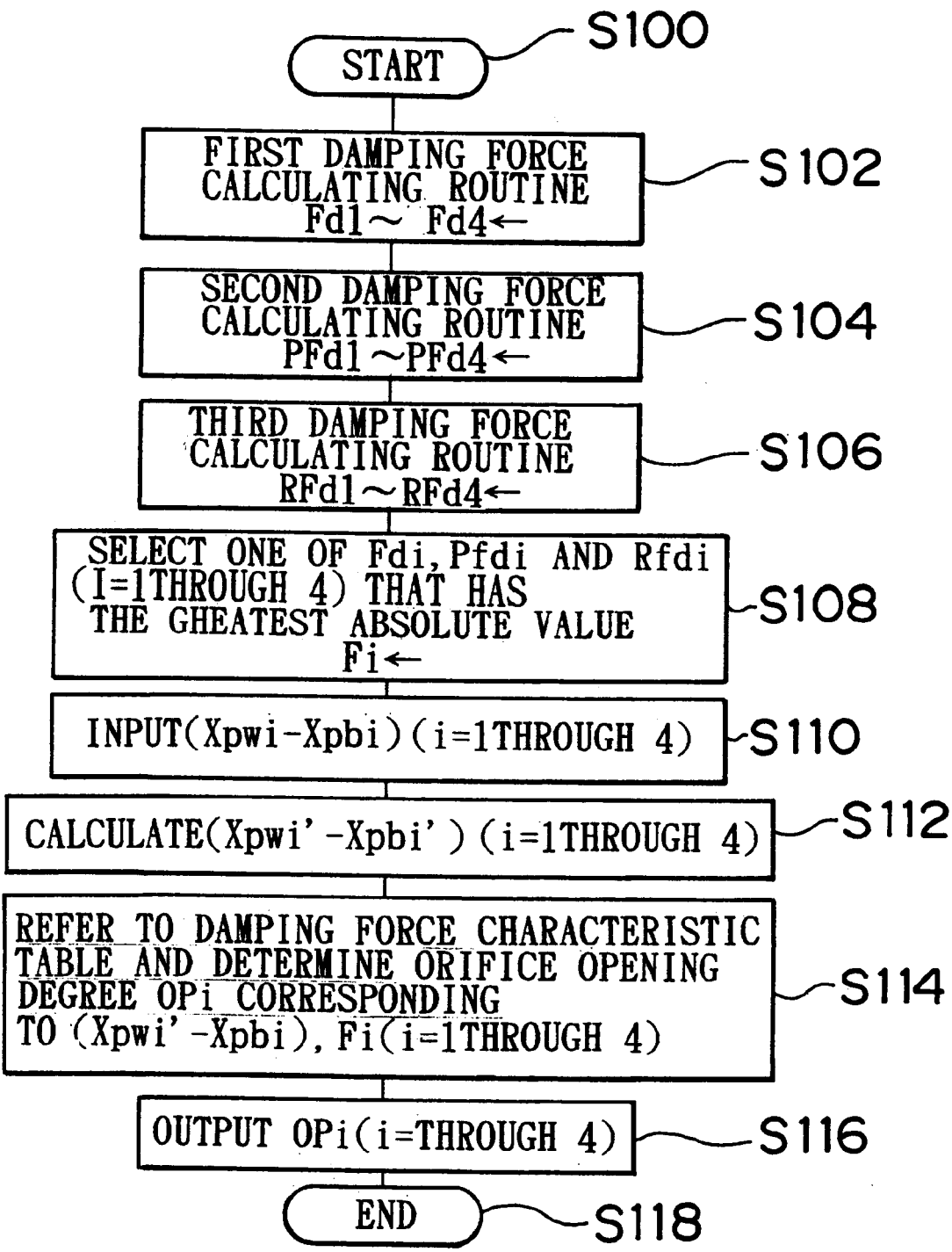
FIG. 2 is a flowchart of a program executed by an electric control device shown in FIG. 1.

Referring back to the description of the program shown in FIG. 2, after the first target damping forces Fd1, Fd2, Fd3 and Fd4, the second target damping forces PFd1, PFd2, PFd3 and PFd4, and the third target damping forces RFd1, RFd2, RFd3 and RFd4 have been calculated through the aforementioned processings of steps 102 through 106, one of the first through third target damping forces that has the greatest absolute value is selected for each of the wheels FW1, FW2, RW1 and RW2 in step 108. That is, respective absolute values |Fd1|, |PFd1|, |RFd1| of the first through third target damping forces Fd1, PFd1 and RFd1 for the front-left wheel FW1 are compared with one another. One of the first through third target damping forces Fd1, PFd1 and RFd1, which corresponds to the greatest one of the absolute values |Fd1|, |PFd1| and |RFd1|, is set as a target damping force F1 for the damper 12a. Processings substantially identical to those for the front-left wheel FW1 are also carried out sequentially for the front-right wheel FW2, the rear-left wheel RW1 and the rear-right wheel RW2. Then the respective target damping forces Fi ("i" denotes an integer of 2 to 4) for the dampers 12b, 12c and 12d are sequentially determined.

Next in step 110, amounts $(X_{pw1}-X_{pb1})$, $(X_{pw2}-X_{pb2})$, $(X_{pw3}-X_{pb3})$ and $(X_{pw4}-X_{pb4})$ of relative displacement are inputted from the relative displacement amount sensors 22a through 22d respectively. In step 112, the inputted amounts $(X_{pw1}-X_{pb1})$, $(X_{pw2}-X_{pb2})$, $(X_{pw3}-X_{pb3})$ and $(X_{pw4}-X_{pb4})$ of relative displacement are differentiated, whereby respective speeds $(X_{pw1}'-X_{pb1}')$, $(X_{pw2}'-X_{pb2}')$, $(X_{pw3}'-X_{pb3}')$ and $(X_{pw4}'-X_{pb4}')$ of the vehicle body BD relative to the wheels FW1, FW2, RW1 and RW2 are calculated respectively.

Figure 9:
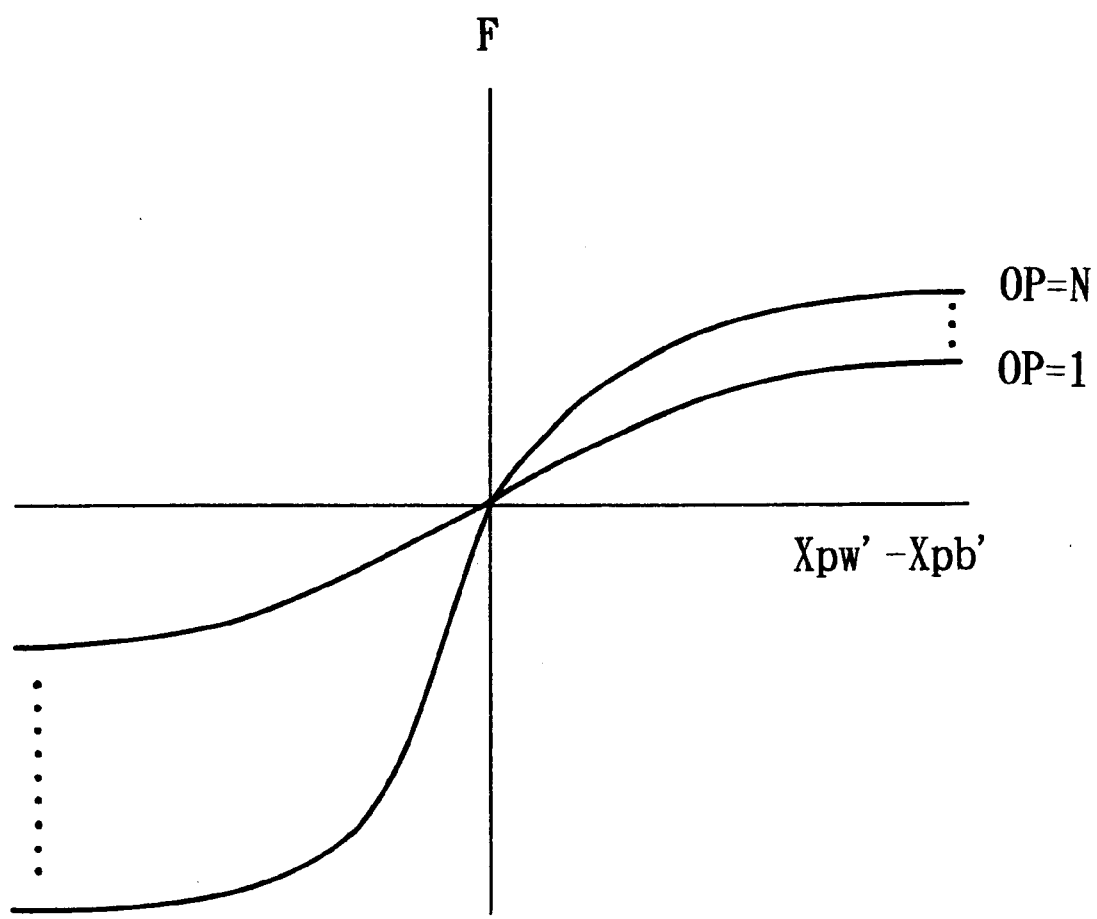
FIG. 9 is a graph showing a data property in a table of relative speed against damping force.

After the aforementioned processing in step 112, with reference to a table of relative speed against damping force, respective orifice opening degrees OP1, OP2, OP3 and OP4 of the dampers 12a, 12b, 12c and 12d, which correspond to the target damping forces F1, F2, F3 and F4 determined by the aforementioned processing in step 108 and to the relative speeds $(X_{pw1}'-X_{pb1}')$, $(X_{pw2}'-X_{pb2}')$, $(X_{pw3}'-X_{pb3}')$ and $(X_{pw4}'-X_{pb4}')$ calculated through the aforementioned processing in step 112 respectively, are determined in step 114. The table of relative speed against damping force is preliminarily built into the microcomputer and stores data which represent, for each of the orifice opening degrees, a characteristic of change in damping force F of the dampers 12a, 12b, 12c and 12d with respect to the relative speed $(X_{pw}'-X_{pb}')$. In determining each of the aforementioned orifice opening degrees OP1, OP2, OP3 and OP4, a curve which is located closest to a point determined by the damping force Fi and the relative speed $(X_{pwi}'-X_{pbi}')$ ("i" denotes an integer of 2 to 4) in the graph shown in FIG. 9 is retrieved. An orifice opening degree OP corresponding to the retrieved curve is selected for each pair of damping force and relative speed.

After the aforementioned processing in step 114, control signals indicative of the orifice opening degrees OP1, OP2, OP3 and OP4 determined in step 116 are outputted to the dampers 12a, 12b, 12c and 12d respectively. The orifice opening degrees of the dampers 12a, 12b, 12c and 12d are controlled to be set to the aforementioned orifice opening degrees OP1, OP2, OP3 and OP4 respectively. As a result, the dampers 12a, 12b, 12c and 12d generate the determined target damping forces F1, F2, F3 and F4 respectively.

As described hitherto, according to the aforementioned embodiment, through the processings of the first damping force calculating routine (FIG. 3), the first target damping forces Fd1, Fd2, Fd3 and Fd4 for inhibiting vibrations of the vehicle body in the heave direction are calculated for the respective wheels, based on the model of a single wheel of the vehicle using the skyhook theory. Through the processings of the second damping force calculating routine (FIG. 5), the second target damping forces PFd1, PFd2, PFd3 and PFd4 for inhibiting vibrations of the vehicle body in the pitch direction are calculated for the respective wheels, based on the model of front and rear wheels of the vehicle. Through the processings of the third damping force calculating routine (FIG. 7), the third target damping forces RFd1, RFd2, RFd3 and RFd4 for inhibiting vibrations of the vehicle body in the roll direction are calculated for the respective wheels, based on the model of left and right wheels of the vehicle. Through the processing of step 108 in FIG. 2, one of the aforementioned first through third target damping forces that has the greatest absolute value is selected as the target damping forces F1, F2, F3 and F4 for the locations of the wheels FW1, FW2, RW1 and RW2 respectively. The damping forces of the dampers 12a, 12b, 12c and 12d at the respective locations of the wheels FW1, FW2, RW1 and RW2 are controlled to be set to the aforementioned target damping forces F1, F2, F3 and F4 respectively.

As a result, only if vibrations of the vehicle body BD in the pitch or roll direction have become strong to a certain extent, on the condition that the first target damping forces Fd1, Fd2, Fd3 and Fd4 are smaller than the second target damping forces PFd1, PFd2, PFd3 and PFd4 or the third target damping forces RFd1, RFd2, RFd3 and RFd4 respectively, the damping forces of the dampers 12a, 12b, 12c and 12d at the locations of the respective wheels FW1, FW2, RW1 and RW2 are respectively set to the second target damping forces PFd1, PFd2, PFd3 and PFd4 or the third target damping forces RFd1, RFd2, RFd3 and RFd4 for inhibiting vibrations of the vehicle body in the pitch or roll direction, based on the model of front and rear wheels or left and right wheels. Otherwise, the damping forces of the dampers 12a, 12b, 12c and 12d are respectively set to the first target damping forces Fd1, Fd2, Fd3 and Fd4 for inhibiting vibrations of the vehicle body in the heave direction, based on the model of a single wheel of the vehicle. Thus, this embodiment compensates for a deficiency in damping force for pitch and roll movements of the vehicle body BD, while ensuring the control performance intrinsic in the first target damping forces Fd1, Fd2, Fd3 and Fd4 for inhibiting vertical vibrations of the vehicle body BD. Therefore, vertical vibrations of the vehicle body BD are effectively inhibited, and vibrations of the vehicle body BD resulting from pitch and roll movements thereof are also inhibited. Consequently the vehicle achieves good riding comfort and high running stability.

In the aforementioned embodiment, one of the first through third target damping forces that has the greatest absolute value is selected as the target damping forces F1, F2, F3 and F4 respectively for the locations of the wheels FW1, FW2, RW1 and RW2. However, in the case where the roll movements of the vehicle body BD are not very serious, calculation of the third target damping forces may be omitted, and either the first target damping forces Fd1, Fd2, Fd3 and Fd4 or the second target damping forces PFd1, PFd2, PFd3 and PFd4, which have the greater absolute values, may be selected as the target damping forces F1, F2, F3 and F4 respectively for the locations of the wheels FW1, FW2, RW1 and RW2. This also compensates for a deficiency in damping force for the pitch movements of the vehicle body BD, while ensuring the control performance intrinsic in the first target damping forces Fd1, Fd2, Fd3 and Fd4 for inhibiting vertical vibrations of the vehicle body BD. Therefore, vertical vibrations of the vehicle body BD are effectively inhibited, and vibrations of the vehicle body BD resulting from pitch movements thereof are also inhibited. Consequently the vehicle achieves good riding comfort and high running stability.

Also, in the case where the pitch movements of the vehicle body BD are not very serious, calculation of the second target damping forces may be omitted, and either the first target damping forces Fd1, Fd2, Fd3 and Fd4 or the third target damping forces RFd1, RFd2, RFd3 and RFd4, which have the greater absolute values, may be selected as the target damping forces F1, F2, F3 and F4 respectively for the locations of the wheels FW1, FW2, RW1 and RW2. This also compensates for a deficiency in damping force for the roll movements of the vehicle body BD, while ensuring the control performance intrinsic in the first target damping forces Fd1, Fd2, Fd3 and Fd4 for inhibiting vertical vibrations of the vehicle body BD. Therefore, vertical vibrations of the vehicle body BD are effectively inhibited, and vibrations of the vehicle body BD resulting from roll movements thereof are also inhibited. Consequently the vehicle achieves good riding comfort and high running stability.

In the aforementioned embodiments, one of the first through third target damping forces that has the greatest absolute value is set as an ultimate target damping force. However, an ultimate target damping force may be determined in the following manners by comparing the respective absolute values of the first through third target damping forces. That is, the first through third target damping forces may be summatively synthesized by increasing weights attributed to the first through third target damping forces in accordance with an increase in the respective absolute values. Alternatively, the two greatest ones of the first through third target damping forces may be selected and summatively synthesized. In conducting summative synthesis, a weight attributed to the greater one of the two selected target damping forces may be increased. In the aforementioned modification example, one of the first and second target damping forces that has the greater absolute value, or one of the first and third target damping forces that has the greater absolute value is determined as an ultimate target damping force. However, an ultimate target damping force may be determined based on the first and second target damping forces or the first and third target damping forces, by increasing a weight attributed to the greater one of the two target damping forces in conducting summative synthesis. This also serves to determine an ultimate target damping force based on the independently calculated first through third target damping forces, first and second target damping forces, or first and third target damping forces. Thus, a deficiency in damping force for pitch and roll movements of the vehicle body is compensated for, while the control performance intrinsic in the first target damping force for inhibiting vertical vibrations of the vehicle body is ensured. Therefore, vertical vibrations of the vehicle body are effectively inhibited, and vibrations of the vehicle body resulting from pitch and roll movements thereof are also inhibited. Consequently the vehicle achieves good riding comfort and high running stability.

Further, the aforementioned embodiment is designed to detect the vertical accelerations $X_{pb1}''$, $X_{pb2}''$, $X_{pb3}''$ and $X_{pb4}'''$ of the vehicle body BD as vertical kinetic state quantities of the vehicle body BD at the locations of the wheels FW1, FW2, RW1 and RW2 relative to absolute space, respectively. Apart from such a construction, the aforementioned embodiment may also be designed to detect the vertical speeds $X_{pb1}'$, $X_{pb2}'$, $X_{pb3}'$ and $X_{pb4}'$ of the vehicle body BD relative to the absolute space. Also, the aforementioned embodiment may be designed to calculate the vertical speeds $X_{pb1}'$, $X_{pb2}'$, $X_{pb3}'$ and $X_{pb4}'$ by detecting the amounts $X_{pb1}$, $X_{pb2}$, $X_{pb3}$ and $X_{pb4}$ of vertical displacement of the vehicle body BD at the locations of the wheels FW1, FW2, RW1 and RW2 relative to the absolute space, respectively. Also, as regards the amounts $(X_{pw1}-X_{pb1})$, $(X_{pw2}-X_{pb2})$, $(X_{pw3}-X_{pb3})$ and $(X_{pw4}-X_{pb4})$ of the vehicle body BD (the sprung member) at the locations of the wheels FW1, FW2, RW1 and RW2 relative to the respective wheels FW1, FW2, RW1 and RW2, the relative speeds $(X_{pw1}'-X_{pb1}')$, $(X_{pw2}'-X_{pb2}')$, $(X_{pw3}'-X_{pb3}')$ and $(X_{pw4}'-X_{pb4}')$ may be detected, or the relative speeds $(X_{pw1}'-X_{pb1}')$, $(X_{pw2}'-X_{pb2}')$, $(X_{pw3}'-X_{pb3}')$ and $(X_{pw4}'-X_{pb4}')$ may be calculated by detecting the relative accelerations $(X_{pw1}''-X_{pb1}'')$, $(X_{pw2}''-X_{pb2}'')$, $(X_{pw3}''-X_{pb3}'')$ and $(X_{pw4}''-X_{pb4}'')$, respectively.

In the aforementioned embodiment, the pitch angular velocity sensor 23 includes a rate sensor provided to detect an angular velocity $P_a'$ of the vehicle body BD in the pitch direction. However, the angular velocity $P_a'$ may be detected from a difference in amount of vertical displacement between front and rear parts of the vehicle body BD. Instead of using the roll angular velocity sensor 24 composed of a rate sensor so as to detect an angular velocity $R_a'$ in the roll direction of the vehicle body BD, the angular velocity $R_a'$ may be detected from a difference in amount of vertical displacement between left and right parts of the vehicle body BD.

Furthermore, the sprung mass acceleration sensors 21a through 21d, the relative displacement amount sensors 22a through 22d, the pitch angular velocity sensor 23 and the roll angular velocity sensor 24 for directly detecting various kinetic state quantities are partially replaced, and the observer may be used to estimate and thus detect part of the various kinetic state quantities.

Next, various modifications of the aforementioned first damping force calculating routine will be described. In these modifications, the aforementioned first target damping forces Fd1, Fd2, Fd3 and Fd4 are calculated based on a control theory which can handle a non-linear plant and provide a design specification in the form of a frequency range. Because the following description is premised on a single wheel model of the vehicle, attention will be focused on only one of the wheels FW1, FW2, RW1 and RW2, and the description will be made as to an embodiment for calculating only the first target damping force Fd which comprehensively represents the first target damping forces Fd1, Fd2, Fd3 and Fd4. As for the other wheels, the first target damping force can be calculated in the same manner. Prior to the description of the various modifications, the single wheel model of the vehicle according to the modifications will be described first.

a. Model

Figure 10:
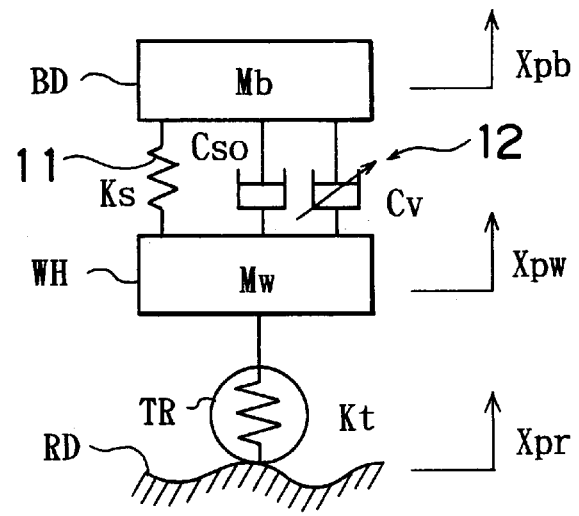
FIG. 10 is a model view of another single wheel of the vehicle and relates to modifications of the invention.

First of all, a model of a suspension system will be considered in an attempt to express the suspension system in a state space. FIG. 10 is a functional view of the suspension system for a single wheel of the vehicle. $M_b$ denotes a mass of the vehicle body (the sprung member) BD, $M_w$ a mass of a wheel WH (more exactly, an unsprung member including a lower arm and the like), and $K_t$ a spring constant of a tire TR. $K_s$ denotes a spring constant of the spring 11, $C_{s0}$ a linear portion of a damping coefficient $C_s$ (hereinafter referred to as a linear damping coefficient) of a damper provided in the suspension system, and $C_v$ a non-linear portion of the damping coefficient $C_s$ (hereinafter referred to as a non-linear damping coefficient). The sum of the linear damping coefficient $C_{s0}$ and the non-linear damping coefficient $C_v$ is an overall damping coefficient of the damper 12 ($C_s=C_{s0}+C_v$). RD denotes a road surface. Given that $X_{pb}$, $X_{pw}$ and $X_{pr}$ denote amounts of displacement of the vehicle body BD, the wheel WH and the road surface RD respectively, equations (26) and (27) of motion are established as shown below.

$$M_b X_{pb}''=K_s(X_{pw}-X_{pb})+C_s(X_{pw}'-X_{pb}')+C_v(X_{pw}'-X_{pb}') \quad (26)$$

$$M_w X_{pw}''=K_t(X_{pr}-X_{pw})-K_s(X_{pw}-X_{pb})-C_s(X_{pw}'-X_{pb}')-C_v(X_{pw}'-X_{pb}') \quad (27)$$

In the aforementioned formulas (26) and (27) and aftermentioned respective formulas, the sign (') indicates single differentiation and the sign ('') indicates double differentiation.

The control input "u" in this suspension system is the non-linear damping coefficient $C_v$. Hence, if the suspension system is expressed in a state space with a road surface disturbance $w_1$ and the non-linear damping coefficient $C_v$ being used as a road surface speed $X_{pr}'$ and the control input "u" respectively, a formula (28) is established as shown below.

$$X_p' = A_p X_p + B_{p1} w_1 + B_{p2}(X_p) u \quad (28)$$

In the aforementioned formula (28), $X_p$, $A_p$, $B_{p1}$ and $B_{p2}(X_p)$ are respectively expressed according to formulas (29) through (32) shown below.

$$X_p = \begin{bmatrix} X_{pr}-X_{pw} \\ X_{pw}-X_{pb} \\ X_{pw}' \\ X_{pb}' \end{bmatrix} \quad (29)$$

$$A_p = \begin{bmatrix} 0 & 0 & -1 & 0 \\ 0 & 0 & 1 & -1 \\ K_t/M_w & -K_s/M_w & -C_s/M_w & C_s/M_w \\ 0 & K_s/M_b & C_s/M_b & -C_s/M_b \end{bmatrix} \quad (30)$$

$$B_{p1} = \begin{bmatrix} 1 \\ 0 \\ 0 \\ 0 \end{bmatrix} \quad (31)$$

$$B_{p2}(X_p) = \begin{bmatrix} 0 \\ 0 \\ -(X_{pw}'-X_{pb}')/M_w \\ (X_{pw}'-X_{pb}')/M_b \end{bmatrix} \quad (32)$$

The suspension system of this modification simultaneously restricts a vertical speed $X_{pb}'$ of the vehicle body BD (hereinafter referred to as a sprung mass speed $X_{pb}'$) which greatly affects vibrations of the vehicle body BD (the sprung mass member), a vertical acceleration $X_{pb}''$ of the vehicle body BD (hereinafter referred to as a sprung mass acceleration $X_{pb}''$) which greatly affects riding comfort of the vehicle, and a vertical speed $(X_{pw}'-X_{pb}')$ of the wheel WH relative to the vehicle body BD (hereinafter referred to as a relative speed $(X_{pw}'-X_{pb}')$) which greatly affects vibrations of the wheel WH. Accordingly, the sprung mass speed $X_{pb}'$, the sprung mass acceleration $X_{pb}''$ and the relative speed $(X_{pw}'-X_{pb}')$ are used as an evaluated output $Z_p$. In the suspension system, it is easy to detect the sprung mass acceleration $X_{pb}''$ and an amount $(X_{pw}-X_{pb})$ of displacement of the wheel WH relative to the vehicle body BD (hereinafter referred to simply as a relative displacement amount $(X_{pw}-X_{pb})$). Therefore the sprung mass acceleration $X_{pb}''$ and the relative displacement amount $(X_{pw}-X_{pb})$ are basically used as an observed output yp. If the observed output $y_p$ is expressed in a state space on the assumption that the observed output yp includes an observed noise $w_2$, formulas (33) and (34) are established as shown below.

$$Z_p = C_{p1} X_p + D_{p12}(X_p) u \quad (33)$$

$$y_p = C_{p2} X_p + D_{p21} w_2 + D_{p22}(X_p) u \quad (34)$$

In the aforementioned formulas (33) and (34), $Z_p$, $y_p$, $C_{p1}$, $D_{p12}(X_p)$, $C_{p2}$, $D_{p21}$ and $D_{p22}(X_p)$ are respectively expressed according to formulas (35) through (41) shown below.

$$Z_p = \begin{bmatrix} X''_{pb} \\ X'_{pb} \\ X'_{pw} - X'_{pb} \end{bmatrix} \quad (35)$$

$$y_p = \begin{bmatrix} X''_{pb} \\ X_{pw} - X_{pb} \end{bmatrix} \quad (36)$$

$$C_{p1} = \begin{bmatrix} 0 & K_s/M_b & C_s/M_b & -C_s/M_b \\ 0 & 0 & 0 & 1 \\ 0 & 0 & 1 & -1 \end{bmatrix} \quad (37)$$

$$D_{p12}(X_p) = \begin{bmatrix} (X'_{pw} - X'_{pb})/M_b \\ 0 \\ 0 \end{bmatrix} \quad (38)$$

$$C_{p2} = \begin{bmatrix} 0 & K_s/M_b & C_s/M_b & -C_s/M_b \\ 0 & 1 & 0 & 0 \end{bmatrix} \quad (39)$$

$$D_{p21} = \begin{bmatrix} 1 & 0 \\ 0 & 1 \end{bmatrix} \quad (40)$$

$$D_{p22}(X_p) = \begin{bmatrix} (X'_{pw} - X'_{pb})/M_b \\ 0 \end{bmatrix} \quad (41)$$

However, since the coefficient $B_{p2}(X_p)$ includes the state quantity $X_p$ as indicated by the aforementioned formula (28), the state space expression of the aforementioned suspension system is a bilinear system. In the bilinear system, since $B_{p2}(0)=0$ at the origin X=0 despite a change in control input u, the execution of control is impossible in the vicinity of the origin. Therefore the control system for the aforementioned suspension system cannot be designed according to the linear control theory. Hence, an attempt is made to design the control system by means of the non-linear H∞ control theory for the purpose of gaining desired control performance. In other words, an attempt is made to design a control system for restricting the sprung mass speed $X_{pb}'$, the sprung mass acceleration $X_{pb}''$ and the relative speed $(X_{pw}'-X_{pb}')$.

Figure 11:
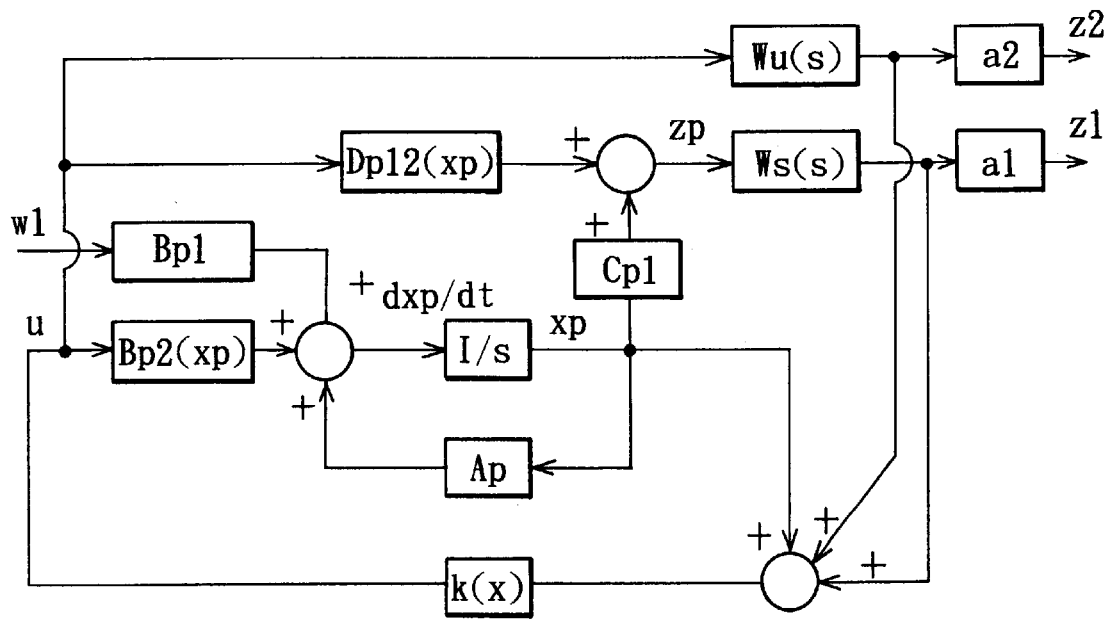
FIG. 11 is a block diagram of a generalized model of a non-linear H∞ state feedback control system and relates to a first modification for calculating a first target damping force.

Hereinafter, various examples of the non-linear H∞ control system according to the various modifications of the invention for calculating the first target damping force Fd, and concrete examples of calculation of the first target damping force Fd will be described.

b. First Modification b1. Designing Example of Non-Linear H∞ State Feedback Control System First of all, in order to make an attempt to design the non-linear H∞ state feedback control system, a generalized model of a state feedback control system as shown in FIG. 11 wherein a frequency weight is added to the evaluated output $Z_p$ and the control input "u" is considered. In this case, the frequency weight means a dynamic weight that changes in accordance with a frequency and is given in the form of a transfer function. Use of the frequency weight makes it possible to increase a weight in a frequency range where the control performance is to be improved and to reduce a weight in a frequency range where the control performance is negligible. In addition, the evaluated output $Z_p$ and the control input "u" is multiplied by frequency weights $W_s(S)$ and $W_u(S)$, respectively, and then multiplied, respectively, by functions a1(X) and a2(X) of the state quantity X. These functions are non-linear weight functions. In order to turn to Riccati's equation and find a solution, the non-linear weights a1(X) and a2(X) demonstrate characteristics defined by formulas (42) and (43) shown below.

$$a1(X)>0, a2(X)>0 \quad (42)$$

$$a1(0)=a2(0)=1 \quad (43)$$

These non-linear weights make it possible to design a control system for restricting an L2 gain more positively. A state space expression of this system is indicated by a formula (44) shown below.

$$X_p'=A_p X_p+B_{p1}w_1+B_{p2}(X_p)u \quad (44)$$

A state space expression of the weight $W_s(S)$ by which the evaluated output $Z_p$ is multiplied is indicated by formulas (45) and (46) shown below.

$$X_w'=A_w X_w+B_w Z_p \quad (45)$$

$$Z_w=C_w X_w+D_w Z_p \quad (46)$$

Figure 12B:
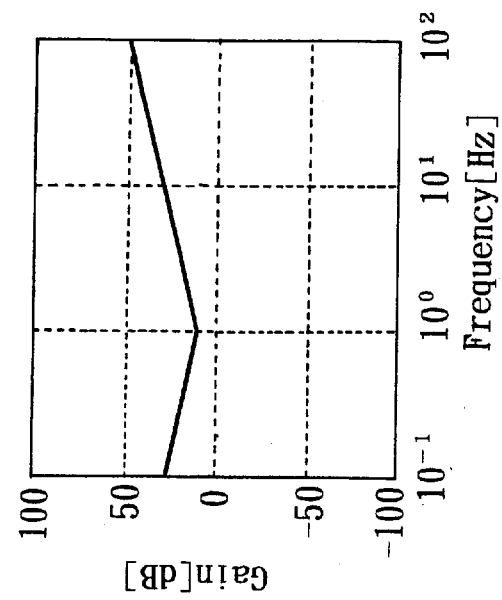
FIG. 12B is a graph showing a frequency weight for a sprung mass speed as an evaluated output.
Figure 12D:
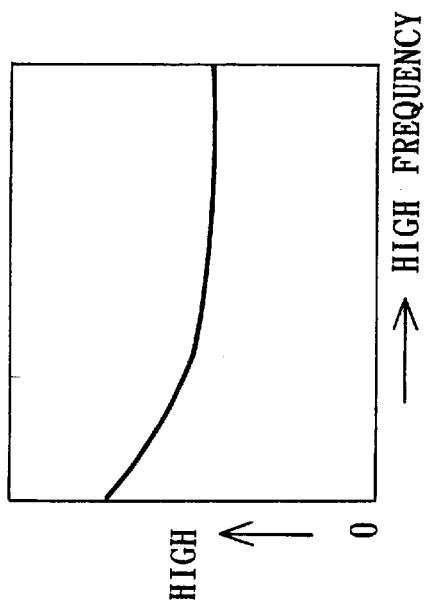
FIG. 12D is a graph showing a frequency weight for a non-linear damping coefficient as a control input.
Figure 12A:
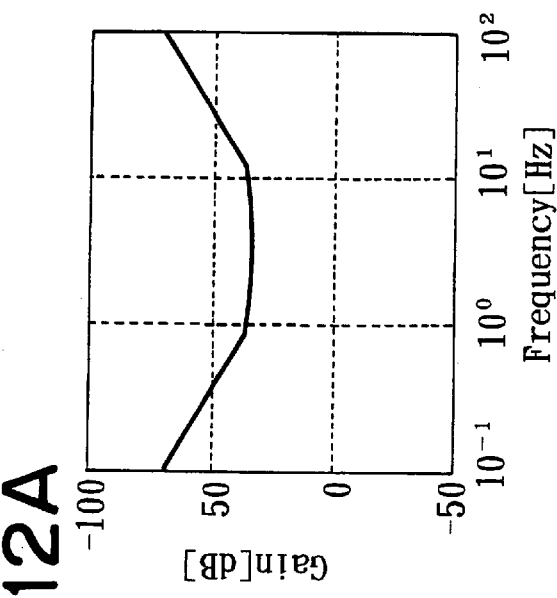
FIG. 12A is a graph showing a frequency weight for a sprung mass acceleration as an evaluated output.
Figure 12C:
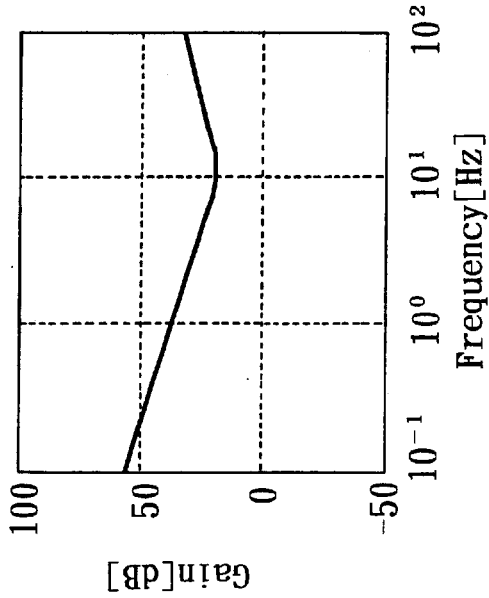
FIG. 12C is a graph showing a frequency weight for a speed of a sprung member relative to an unsprung member as an evaluated output.

$X_w$ denotes a state quantity of the frequency weight $W_s(S)$, and $Z_w$ denotes an output of the frequency weight $W_s(S)$. $A_w$, $B_w$, $C_w$ and $D_w$ are constant matrices determined by a control specification. These constant matrices $A_w$, $B_w$, $C_w$ and $D_w$ are so determined as to reduce a gain for the sprung mass acceleration $X_b''$ in a frequency range of about 3 to 8 Hz (FIG. 12(A)) with a view to improving riding comfort of the passenger (eliminating a feeling of cragginess), reduce a gain for the sprung mass speed $X_b'$ in a frequency range of about 0.5 to 1.5 Hz (FIG. 12(B)) with a view to inhibiting resonance of the vehicle body BD, and reduce a gain for the relative speed $(X_w'-X_b')$ in a frequency range of about 10 to 14 Hz (FIG. 12(C)) with a view to avoiding resonance of the wheel WH. While the frequency ranges for reducing these respective gains are prevented from overlapping with one another and thus prevented from interfering with one another, respective elements constituting the evaluated output $Z_p$, namely, the sprung mass acceleration $X_b''$, the sprung mass speed $X_b'$ and the relative speed $(X_w'-X_b')$ are controlled independently.

A state space expression of the weight $W_u(S)$ by which the control input "u" is multiplied is indicated by formulas (47) and (48) shown below.

$$X_u'=A_u X_u+B_u u \quad (47)$$

$$Z_u=C_u X_u+D_u u \quad (48)$$

$X_u$ denotes a state quantity of the frequency weight $W_u(S)$, and $Z_u$ denotes an output of the frequency weight $W_u(S)$. $A_u$, $B_u$, $C_u$ and $D_u$ are constant matrices determined by a control specification. In order to consider responding performance of an electric actuator for controlling the damping coefficient, the constant matrices $A_u$, $B_u$, $C_u$ and $D_u$ are determined such that a gain for the control input "u" is restricted in a high frequency range in accordance with a frequency characteristic of the actuator (FIG. 12(D)).

At this moment, a state space expression of a generalized model in the non-linear H∞ state feedback control system is indicated by formulas (49) through (51) shown below.

$$X'=AX+B_1 w_1+B_2(X)u \quad (49)$$

$$Z_1=a1(X)(C_{11}X+D_{121}(X)u) \quad (50)$$

$$Z_2=a2(X)(C_{12}X+D_{122}u) \quad (51)$$

In the aforementioned formulas (49) through (51), X, A, $B_1$, $B_2(X)$, $C_{11}$, $D_{121}(X)$, $C_{12}$ and $D_{122}$ are expressed respectively by formulas (52) through (59) shown below.

$$X = \begin{bmatrix} X_p \\ X_w \\ X_u \end{bmatrix} \quad (52)$$

$$A = \begin{bmatrix} A_p & 0 & 0 \\ B_w C_{pl} & A_w & 0 \\ 0 & 0 & A_u \end{bmatrix} \quad (53)$$

$$B_1 = \begin{bmatrix} B_{pl} \\ B_w D_{pll} \\ 0 \end{bmatrix} \quad (54)$$

$$B_2(X) = \begin{bmatrix} B_{p2}(X_p) \\ B_w D_{pl2}(X_p) \\ B_u \end{bmatrix} \quad (55)$$

$$C_{11} = [D_w V C_{p1} \; C_w \; 0] \quad (56)$$

$$D_{121(X)} = [D_w D_{p12}(X_p)] \quad (57)$$

$$C_{12} = [0 \; 0 \; C_u] \quad (58)$$

$$D_{122} = D_u \quad (59)$$

Next, in order to find a solution based on Riccati's equation, if the state space expression of the generalized model expressed by the aforementioned formulas (49) through (51) is rewritten under the condition defined by a formula (60) shown below, formulas (60) through (63) are obtained as shown below.

$$D_w D_{p12}(X) = 0 \quad (60)$$

$$X' = AX + B_1 w + B_2(X) u \quad (61)$$

$$Z_1 = a1(X) C_{11} X \quad (62)$$

$$Z_2 = a2(X) C_{12} X + a2(X) D_{122} u \quad (63)$$

Because A is a stable matrix indicative of a damping force control system, an attempt is made to design, for the aforementioned generalized model, a non-linear H∞ state feedback control rule u=k(X) which satisfies the condition (1) that the closed-loop system has a stable internal exponent and the condition (2) that the L2 gain from the road surface disturbance $w_1$ to the evaluated output Z is equal to or smaller than a positive constant γ.

The aforementioned non-linear H∞ state feedback control rule u=k(X) can be obtained if the following conditions are established. That is, (1) if $D_{122}^{-1}$ exists and a positive constant γ is given, a positive definite symmetric solution P satisfying the after-mentioned Riccati's equation (64) exists for the positive constant γ, and (2) if the non-linear weights a1(X) and a2(X) satisfy a restrictive condition expressed by a formula (65) shown below, one of the control rules u=k(X) for internally stabilizing the closed-loop system and making the L2 gain equal to or smaller than γ is given by a formula (66) shown below.

$$PA + A^T P + \frac{P B_1 B_1^T P}{\gamma^2} + C_{11}^T C_{11} + C_{12}^T C_{12} < 0 \quad (64)$$

$$(1 - a1(X)^2) X^T C_{11}^T C_{11} X + \left[\frac{1}{a2(X)^2} - 1\right] \quad (65)$$
$$X^T P B_2(X) D_{122}^{-1} D_{122}^{-T} B_2^T(X) P X \geq 0$$

$$u = k(X) \quad (66)$$
$$= -D_{122}^{-1} \left[\frac{1}{a2(X)^2} D_{122}^{-1} B_2^T(X) P + C_{12}\right] X$$

The non-linear weights a1(X) and a2(X) satisfying the restrictive condition of the formula (66) are exemplified respectively in formulas (67) and (68) shown below.

$$a1(X) = \sqrt{1 + m1(X) X^T P B_2(X) D_{122}^{-1} D_{122}^{-T} B_2^T(X) P X} \quad (67)$$

$$a2(X) = \sqrt{\frac{1}{1 + m1(X) X^T C_{11}^T C_{11} X}} \quad (68)$$

In the aforementioned formulas (67) and (68), m1(X) is an arbitrary positive definite function. As a result of calculations made by the computer, it has been made possible to find the positive definite symmetric solution P as described above. By using the aforementioned formula (68), the aforementioned formula (66) is converted into a formula (69) shown below.

$$u = k(X) \quad (69)$$
$$= -D_{122}^{-1}((1 + m1(X) X^T C_{11}^T C_{11} X) D_{122}^{-T} B_2^T(X) P + C_{12}) X$$

This means that although a partial differential inequality called Hamilton-Jacobi's inequality must be solved in general in order to design a control system using the non-linear H∞ control theory, the control rule can be designed by solving Riccati's inequality instead of Hamilton-Jacobi's inequality, by imposing the restrictive condition of the aforementioned formula (65) on the non-linear weights a1(X) and a2(X) as described above. Riccati's inequality can be solved easily by using a known software, such as Matlab. Thus, this method makes it possible to easily find a positive definite symmetric solution P and to derive the control rule u=k(X).

The aforementioned $D_{122}$ does not exist in Riccati's inequality and relates only to the restrictive condition imposed on the non-linear weights and the control rule. This means that the control rule using $D_{122}$ can be adjusted to some extent without solving Riccati's inequality again. In other words, adjustment of the aforementioned control rule means the scaling of the control input "u". If the scaling ratio is multiplied by 10, $D_{122}$ is multiplied by 1/10 and the terms of $B_2(X)$ and $C_{12}$ in the aforementioned formula (66) are multiplied by 100 and 10, respectively.

Next, in order to confirm a role played by the non-linear weights, a generalized model of a bilinear system that does not employ any non-linear weight will be considered and compared with the aforementioned generalized model that employs the non-linear weights. That is, the aforementioned non-linear weights a1(X) and a2(X) are defined as a1(X)=1 and a2(X)=1 respectively. Also, for the sake of simplification, it is determined that $C_{12}=0$ and that $D_{122}=1$, on the assumption that an orthogonal condition is satisfied.

The state space expression indicated by the aforementioned formulas (61) through (63) is expressed according to formulas (70) through (72) shown below.

$$X' = AX + B_1 W + B_2(X)u \tag{70}$$

$$Z_1 = C_{11} X \tag{71}$$

$$Z_2 = u \tag{72}$$

Thus, the control rule u=k(X) for the generalized model is expressed according to a formula (73) shown below.

$$u = B_2^T(X) P X \tag{73}$$

P is a positive definite symmetric solution that satisfies Riccati's inequality (74) shown below.

$$PA + A^T P + \frac{1}{\gamma^2} P B_1 B_1^T P + C_{11}^T C_{11} < 0 \tag{74}$$

A linear approximation system in the vicinity of the origin of the generalized model indicated by the aforementioned formulas (70) through (72) is expressed according to formulas (75) through (77) shown below.

$$X' = AX + B_1 W \tag{75}$$

$$Z_1 = C_{11} X \tag{76}$$

$$Z_2 = u \tag{77}$$

Figure 13:
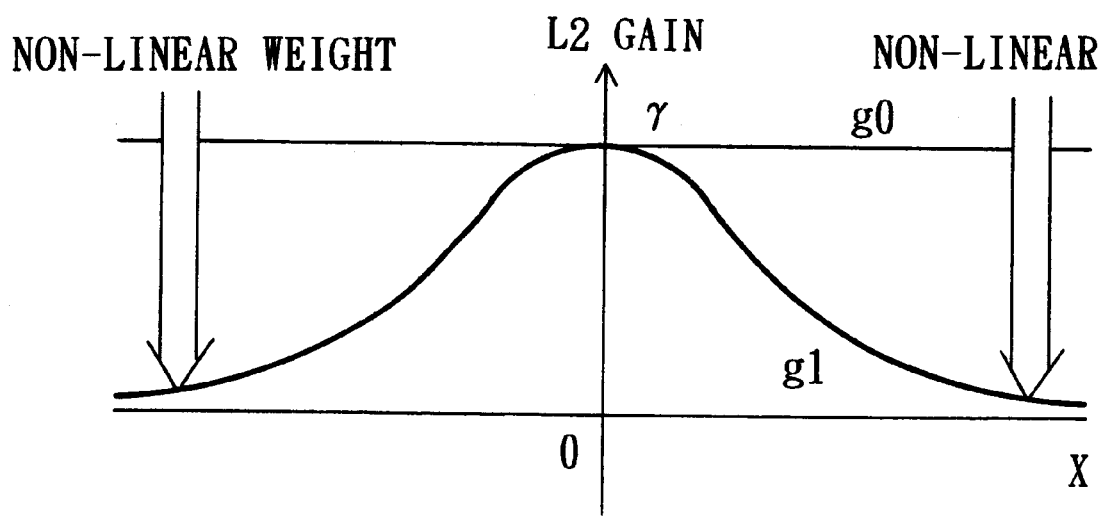
FIG. 13 is an image view showing operation and effect of the control based on the non-linear H∞ control theory.

Riccati's inequality in the aforementioned formula (74) means that the closed-loop system is internally stable for the generalized model and that the L2 gain is equal to or smaller than γ. That is, the L2 gain of the bilinear system is determined by a value at the origin (Z=0) shown in FIG. 13. This is because the bilinear system is $B_2(0)=0$ at the origin and therefore the control input "u" is so ineffective that the L2 gain cannot be improved in the vicinity of the origin. The generalized model with the control input u being equal to 0 (the formulas (70) through (72)) also coincides with the linearly approximated generalized model (the formulas (75) through (77)). Hence, Riccati's inequality in the formula (74) means that even in the case where the control input "u" is equal to 0 for the generalized model (the formulas (70) through (72)), the closed-loop system is internally stable and the L2 gain is equal to or smaller than γ. That is, even if the state quantity X has increased and the control input u has become effective, in the case where a control system is designed for the generalized model (the formulas (70) through (72)) with a control output expressed by formulas (78) and (79) shown below, it is merely guaranteed that the L2 gain does not become greater than $g_0$ even after being multiplied by the control input "u".

$$Z_1 = C_{11} X \tag{78}$$

$$Z_2 = u \tag{79}$$

That is, if the control output is expressed as in the aforementioned formulas (78) and (79), the control performance may improve through the use of the control input "u" but may not make any difference in comparison with the case of u=0. Thus, the non-linear weights a1(X) and a2(X) are applied to control outputs $Z_1$ and $Z_2$ respectively, whereby formulas (80) and (81) are established as shown below. This makes it possible to design a control system for making the L2 gain of the plant closer to the X axis which represents the origin level by means of the non-linear weights at locations remote from the origin, as indicated by a line $g_1$ in FIG. 13.

$$Z_1 = a1(X) C_{11} X \tag{80}$$

$$Z_2 = a2(X) u \tag{81}$$

Figure 14A:
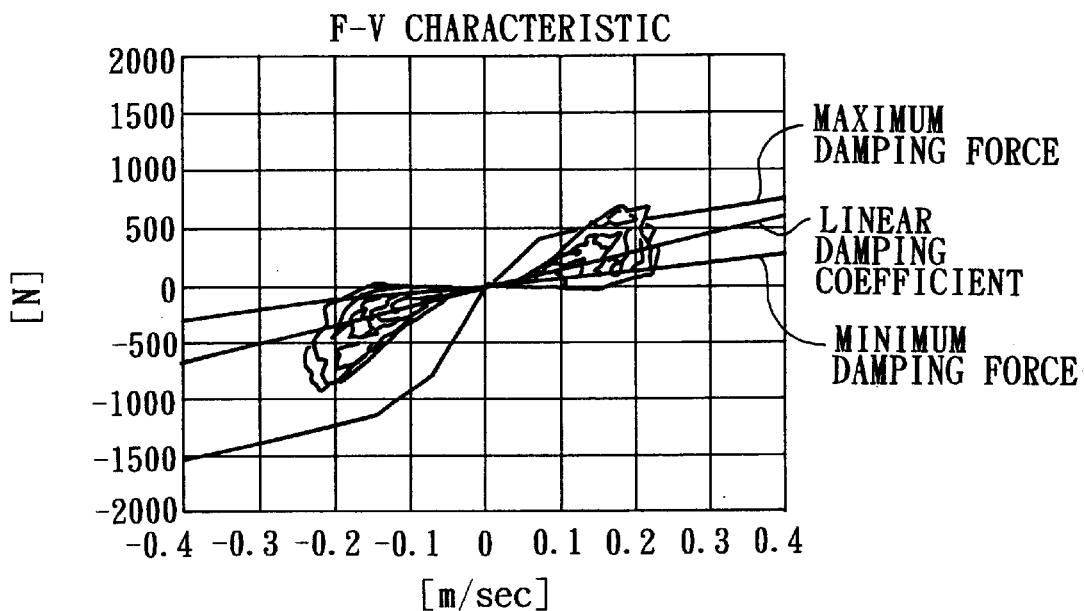
FIG. 14A is a Lissajou's waveform diagram showing a characteristic of damping force against relative speed (F-V) in the damping force control according to the modification for calculating the first target damping force.
Figure 14B:
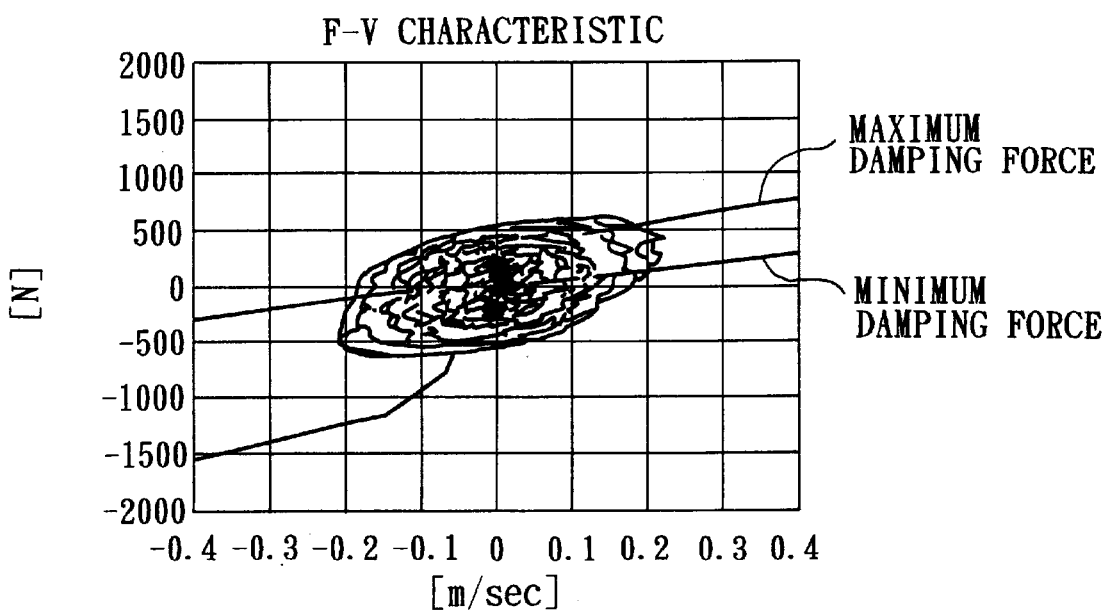
FIG. 14B is a Lissajou's waveform diagram showing a characteristic of damping force against relative speed (F-V) in the previously employed skyhook control.

In this control, the damping coefficient $C_s$ of the damper 12 is divided into the linear damping coefficient $C_{s0}$ and the non-linear damping coefficient $C_v$, and the control system has been designed with the non-linear damping coefficient $C_v$ being used as the control input "u". As shown in FIG. 14A, the linear damping coefficient $C_{s0}$ is approximately set to the vicinity of the center between a minimum damping force characteristic curve (corresponding to a maximum orifice opening degree) of the damper 12 and a maximum damping force characteristic curve (corresponding to a minimum orifice opening degree) of the damper 12, and the gain of the control input "u" is controlled in accordance with a frequency. The damping coefficient $C_s$ changes on opposed sides of the linear damping coefficient $C_{s0}$, and the damping force obtained from the linear damping coefficient $C_{s0}$ is designed to remain between the aforementioned minimum and maximum damping force characteristic curves. Accordingly, the non-linear damping coefficient $C_v$ can easily be determined in accordance with a design specification of the damper 12, and the damping force control can be performed within a range feasible with the actual damper 12. Consequently, the damping force control can be performed as desired. For comparison, FIG. 14B shows Lissajou's waveform diagram in the case where the damping coefficient of the damper 12 is controlled based on the skyhook theory. In this case, the control cannot be performed within the range feasible with the actual damper 12, and it is impossible to perform the control as desired.

Further, if the damping force (the damping coefficient) of the damper 12 is designed to be switched stepwise to one of a plurality of stages, the aforementioned linear damping coefficient $C_{s0}$ is set such that the damping force determined by the linear damping coefficient $C_{s0}$ becomes, within a range of small damping forces, substantially equal to a damping force generated by a predetermined one of the aforementioned stages of the damper 12. In the suspension system of this kind, in a range where the damping force is small, the linearity of the damping force with respect to the relative speed is strong. In other words, it is quite likely that the calculated non-linear damping coefficient $C_v$ will be equal to "0". Thus, it is highly probable that the damper 12 be maintained at the predetermined one of the stages, and the frequency with which the damping coefficient is switched decreases. Therefore, high durability is rendered to the damper 12.

b2. Calculation Example of First Modification

Next, a calculation example of the first target damping force Fd using the aforementioned non-linear H∞ state feedback control rule will be described.

In this case, in addition to the sprung mass acceleration sensors 21a, 21b, 21c and 21d, the relative displacement amount sensors 22a, 22b, 22c and 22d, the pitch angular velocity sensor 23 and the roll angular velocity sensor 24, tire displacement amount sensors 25a, 25b, 25c and 25d and unsprung mass acceleration sensors 26a, 26b, 26c and 26d, which are provided for the wheels FW1, FW2, RW1 and RW2 respectively, are connected to the electric control device 20, as indicated by broken lines in FIG. 1. However, the following description will deal with an example of calculating the first target damping force Fd of a single wheel representative of the wheels FW1, FW2, RW1 and RW2. Therefore, in the following description, the tire displacement amount sensors 25a, 25b, 25c and 25d will be referred to simply as a tire displacement amount sensor 25, and the unsprung mass acceleration sensors 26a, 26b, 26c and 26d will be referred to simply as an unsprung mass acceleration sensor 26. Likewise, the sprung mass acceleration sensors 21a, 21b, 21c and 21d and the relative displacement amount sensors 22a, 22b, 22c and 22d will be referred to simply as a sprung mass acceleration sensor 21 and a relative displacement amount sensor 22 respectively.

Figure 15:
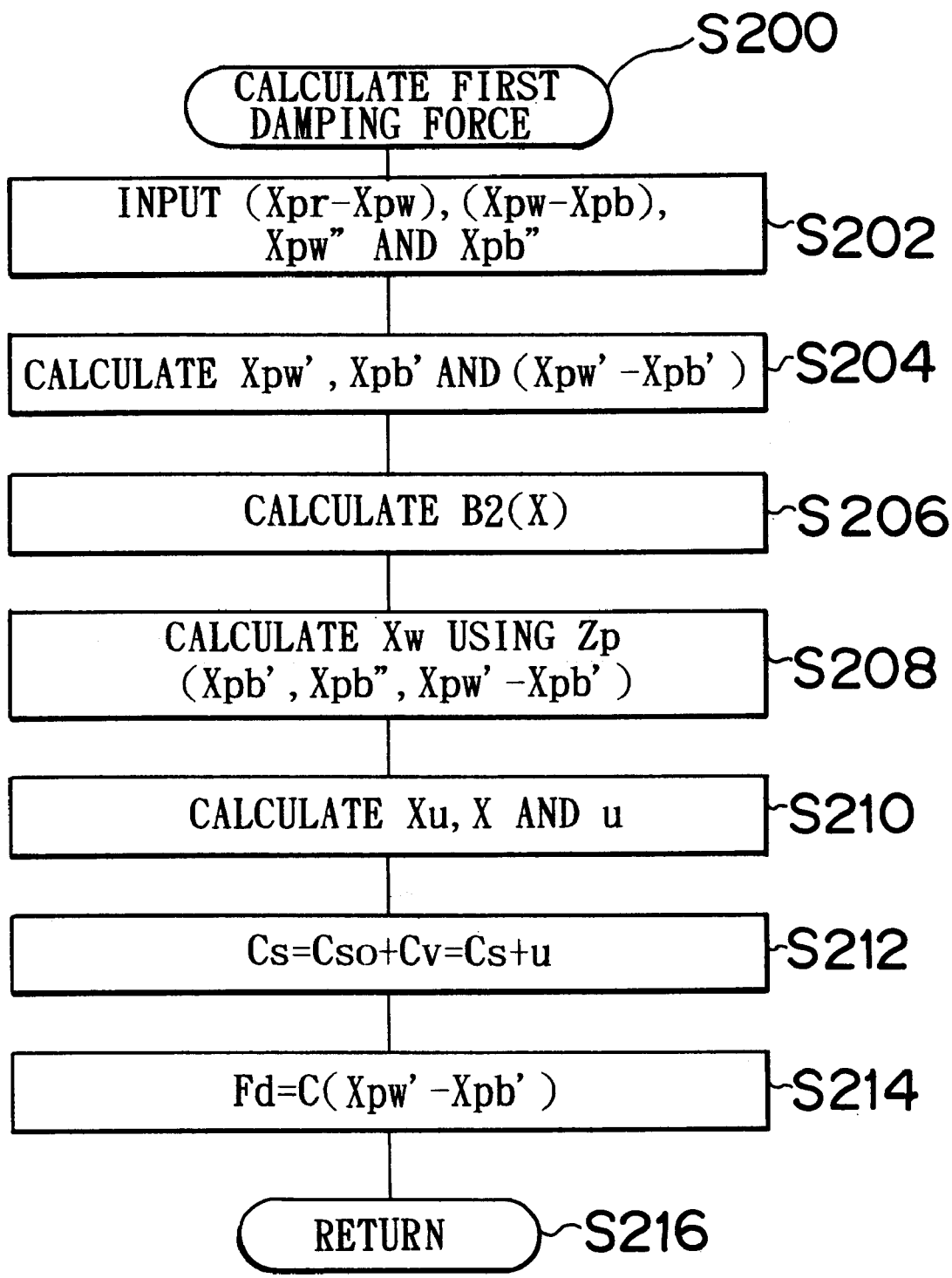
FIG. 15 is a flowchart of a first damping force calculating routine according to the first modification for calculating the first target damping force.

The tire displacement amount sensor 25 detects an amount $(X_{pr}-X_{pw})$ of displacement of the tire TR, which is a relative displacement amount between a road surface displacement $X_{pr}$ and an unsprung mass displacement $X_{pw}$. For example, the tire displacement amount $(X_{pr}-X_{pw})$ is detected based on outputs from a strain sensor for detecting a degree of deformation of the tire, a pressure sensor for detecting an air pressure of the tire and the like. The unsprung mass acceleration sensor 26 is fixed to the wheel WH and detects an unsprung mass acceleration $X_{pw}''$ indicative of a vertical acceleration of the wheel WH. The microcomputer in the electric control device 20 executes a first damping force calculating routine shown in FIG. 15 at intervals of a predetermined period of time by means of the built-in timer, and thereby calculates a first target damping force Fd.

The execution of the first damping force calculating routine is started in step 200. In step 202, detection signals indicative of the tire displacement amount $(X_{pr}-X_{pw})$, the relative displacement amount $(X_{pw}-X_{pb})$, the sprung mass acceleration $X_{pb}''$ and the unsprung mass acceleration $X_{pw}''$ are inputted from the tire displacement amount sensor 25, the relative displacement amount sensor 22, the sprung mass acceleration sensor 21 and the unsprung mass acceleration sensor 26 respectively. Then in step 204, the sprung mass acceleration $X_{pb}''$ and the unsprung mass acceleration $X_{pw}''$ are time-integrated, whereby a sprung mass speed $X_{pb}'$ and an unsprung mass speed $X_{pw}'$ are calculated. Also, the relative displacement amount $(X_{pw}-X_{pb})$ is time-differentiated, whereby a relative speed $(X_{pw}'-X_{pb}')$ is calculated.

Next in step 206, $B_{p2}(X_p)$ and $D_{p12}(X_p)$ are calculated according to after-mentioned formulas (82) and (83), which are identical to the aforementioned formulas (32) and (38) using the relative speed $(X_{pw}'-X_{pb}')$. $B_2(X)$ is then calculated according to an after-mentioned formula (84), which is identical to the aforementioned formula (55) using $B_{p2}(X_p)$ and $D_{p12}(X_p)$.

$$B_{p2}(X_p) = \begin{bmatrix} 0 \\ 0 \\ -(X_{pw}' - X_{pb}')/M_w \\ (X_{pw}' - X_{pb}')/M_b \end{bmatrix} \quad (82)$$

$$D_{p12}(X_p) = \begin{bmatrix} (X_{pw}' - X_{pb}')/M_b \\ 0 \\ 0 \end{bmatrix} \quad (83)$$

$$B_2(X) = \begin{bmatrix} B_{p2}(X_p) \\ B_w D_{p12}(X_p) \\ B_u \end{bmatrix} \quad (84)$$

In the aforementioned formulas (82) and (83), $M_w$ and $M_b$ denote a mass of the wheel WH and a mass of the vehicle body BD, respectively. In the aforementioned formula (84), $B_w$ and $B_u$ denote coefficient matrices relating to the frequency weights $W_s(S)$ and $W_u(S)$ set in the aforementioned formulas (45) and (47) respectively. These coefficient matrices are constant matrices that are preliminarily stored in the microcomputer.

After the aforementioned processing of step 206, a state variable $X_w$ of the frequency weights is calculated in step 208 according to an after-mentioned formula (85) identical to the aforementioned formula (45), using the evaluated output $Z_p$ (the sprung mass speed $X_{pb}'$, the sprung mass acceleration $X_{pb}''$ and the relative speed $(X_{pw}'-X_{pb}')$) which is a control target of this example that has been inputted in the processing is of step 202 or calculated in the processing of step 204 and is defined by the aforementioned formula (35).

$$X_w' = A_w X_w + B_w Z_p \quad (85)$$

In the aforementioned formula (85), $A_w$ and $B_w$ denote coefficient matrices relating to the frequency weight $W_s(S)$ set in the aforementioned formula (45). These matrices are constant matrices that are preliminarily stored in the microcomputer.

Next in step 210, a state variable $X_u$ of the frequency weight relating to the control input "u", an extended state quantity X and a control input "u" are calculated, using formulas (86) through (88) which are identical to the aforementioned formulas (47), (52) and (69) respectively.

$$X_u' = A_u X_u + B_u u \quad (86)$$

$$X = \begin{bmatrix} X_p \\ X_w \\ X_u \end{bmatrix} \quad (87)$$

$$\begin{aligned} u &= k(X) \\ &= -D_{122}^{-1}((1 + m1(X)X^T C_{11}^T C_{11} X)D_{122}^{-T} B_2^T(X)P + C_{12})X \end{aligned} \quad (88)$$

In the aforementioned formula (86), $A_u$ and $B_u$ are coefficient matrices relating to the frequency weight $W_u(S)$ set in the aforementioned formula (47). These matrices are constant matrices that are preliminarily stored in the microcomputer. $D_{122}$ in the aforementioned formula (88), which is defined by the aforementioned formula (59), is a coefficient matrix relating to the frequency weight $W_u(S)$ set in the aforementioned formula (48) and is a constant matrix preliminarily stored in the microcomputer. m1(X) is an arbitrary positive definite function, and an algorithm concerning the function is preliminarily stored in the microcomputer. The positive definite function m1(X) may be set to a positive constant, for example, "1.0". $C_{11}$ is defined by the aforementioned formulas (37) and (56). In other words, $C_{11}$ is a constant matrix which is preliminarily stored in the microcomputer and which is defined by the mass $M_w$ of the wheel, the mass $M_b$ of the vehicle body BD, the spring constant $K_s$ of the spring 11, the linear damping coefficient $C_{s0}$ of the damper 12 and the coefficient matrices $C_w$ and $D_w$ relating to the frequency weight $W_s(S)$ set in the aforementioned formula (46). $B_2(X)$ is a matrix calculated in the aforementioned step 206. P is a positive definite symmetric solution satisfying the aforementioned formulas (64) and (65) and is a constant matrix that is preliminarily stored in the microcomputer. $C_{12}$, which is defined by the aforementioned formula (58), is a constant matrix that includes the coefficient matrix $C_u$ relating to the frequency weight $W_u(S)$ set in the aforementioned formula (48) and is preliminarily stored in the microcomputer.

In calculating the state variable $X_u$ relating to the frequency weight of the control input u, the extended state quantity X and the control input "u" in step 210, the respective values $X_u$, X and u are supplied with initial values, and calculations according to the aforementioned formulas (85) through (88) are repeatedly made until the respective values $X_u$, X and u converge. In this manner, the values $X_u$, X and u are determined.

After the aforementioned processing in step 210, since the control input "u" is equal to the non-linear damping coefficient $C_v$, an overall target damping coefficient $C_s$ of the damper 12 is calculated in step 212 according to an aftermentioned formula (89) wherein the linear damping coefficient $C_{s0}$ is added to the control input "u". In step 216, the execution of the first damping force calculating routine is terminated.

$$C_s = C_{s0} + C_v = C_{s0} + u \tag{89}$$

Figure 16:
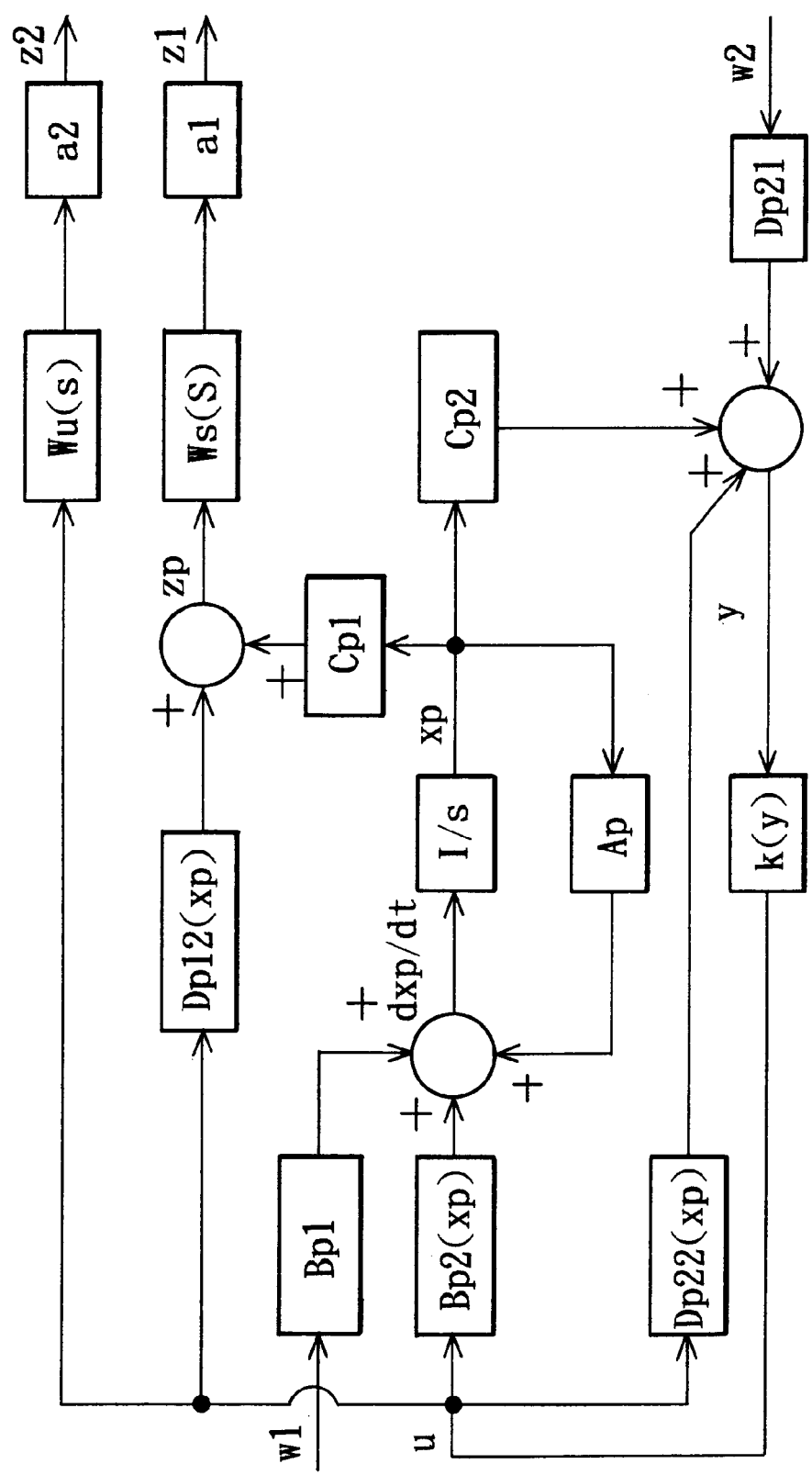
FIG. 16 is a block diagram of a generalized model of a non-linear H∞ output feedback control system and relates to a second modification for calculating the first target damping force.

Next in step 214, the first target damping force Fd is calculated according to an after-mentioned formula (90) wherein the calculated target damping coefficient C is multiplied by the relative speed $(X_{pw}' - X_{pb}')$ calculated in the aforementioned processing of step 204.

$$Fd = C_s(X_{pw}' - X_{pb}') \tag{90}$$

c. Second Modification c1. Designing Example of Non-Linear H∞ Output Feedback Control System Next, the designing of the aforementioned non-linear H∞ state feedback control system will be further explained. That is, an estimated value will be obtained from an observer which includes part (e.g. the tire displacement amount $(X_{pr} - X_{pw})$ and the relative displacement amount $(X_{pw} - X_{pb})$ or the tire displacement amount $(X_{pr} - X_{pw})$, the relative displacement amount $(X_{pw} - X_{pb})$ and the unsprung mass speed $X_{pw}'$) of the state quantity $X_p$ (the tire displacement amount $(X_{pr} - X_{pw})$, the relative displacement amount $(X_{pw} - X_{pb})$, the unsprung mass speed $X_{pw}'$ and the sprung mass acceleration $X_{pb}''$) in the control system, and the estimated value will be used in an attempt to design a non-linear H∞ output feedback control system. In this case, a generalized model of an output feedback control system as shown in FIG. 16 wherein frequency weights are added to the evaluated output $Z_p$ and the control input "u" will be considered. In this case, the evaluated output $Z_p$ is multiplied by a non-linear weight function $a1(X, X^\wedge)$ after being multiplied by the frequency weight $W_s(S)$, and the control input "u" is multiplied by a non-linear weight function $a2(X, X^\wedge)$ after being multiplied by the frequency weight $W_u(S)$. These non-linear weight functions $a1(X, X^\wedge)$ and $a2(X, X^\wedge)$ have characteristics indicated by formulas (91) and (92) shown below. This makes it possible to design a control system for restricting the L2 gain more positively. As described above, $X^\wedge$ denotes a state quantity partially including an estimated value.

$$a1(X, X^\wedge) > 0, \quad a2(X, X^\wedge) > 0 \tag{91}$$

$$a1(0, 0) = a2(0, 0) = 1 \tag{92}$$

A state space expression of this system, as well as a state space expression of the frequency weight $W_s(S)$ by which the evaluated output $Z_p$ is multiplied and a state space expression of the frequency weight $W_u(S)$ by which the control input "u" is multiplied, is expressed according to formulas (93) through (97) shown below, as is the case with the aforementioned state feedback control system.

$$X_p' = A_p X_p + B_{p1} w_1 + B_{p2}(X_p) u \tag{93}$$

$$X_w' = A_w X_w + B_w Z_p \tag{94}$$

$$Z_w = C_w X_w + D_w Z_p \tag{95}$$

$$X_u' = A_u X_u + B_u u \tag{96}$$

$$Z_u = C_u X_u + D_u u \tag{97}$$

The state variable $X_w$, the evaluated function $Z_w$ and the constant matrices $A_w$, $B_w$, $C_w$ and $D_w$ are the same as in the case of the aforementioned state feedback control system.

However, a state space expression of the generalized model in this non-linear H∞ output feedback control system is indicated by formulas (98) through (101) shown below.

$$X' = AX + B_1 w + B_2(X) u \tag{98}$$

$$Z_1 = a1(X, X^\wedge)(C_{11}X + D_{121}(X)u) \tag{99}$$

$$Z_2 = a2(X, X^\wedge)(C_{12}X + D_{122}u) \tag{100}$$

$$y = C_2 X + D_{21} W + D_{22}(X) u \tag{101}$$

X, W, A, $B_1$, $B_2(X)$, $C_{11}$, $D_{121}(X)$, $C_{12}$, $D_{122}$, $C_2$, $D_{21}$ and $D_{22}(X)$ in the aforementioned formulas (98) through (101) are respectively expressed according to formulas (102) through (113) shown below.

$$X = \begin{bmatrix} X_p \\ X_w \\ X_u \end{bmatrix} \tag{102}$$

$$W = \begin{bmatrix} W_1 \\ W_2 \end{bmatrix} \tag{103}$$

$$A = \begin{bmatrix} A_p & 0 & 0 \\ B_w C_{pl} & A_w & 0 \\ 0 & 0 & A_u \end{bmatrix} \tag{104}$$

$$B_1 = \begin{bmatrix} B_{pl} & 0 \\ B_w D_{pl1} & 0 \\ 0 & 0 \end{bmatrix} \tag{105}$$

$$B_2(X) = \begin{bmatrix} B_{p2}(X_p) \\ B_w D_{pl2}(X_p) \\ Bu \end{bmatrix} \tag{106}$$

$$C_{11} = [D_w C_{p1} \ C_w \ 0] \tag{107}$$

$$D_{121}(X) = [D_w D_{p12}(X_p)] \tag{108}$$

$$C_{12} = [0 \ 0 \ C_u] \tag{109}$$

$$D_{122} = D_u \tag{110}$$

$$C_2 = [C_{p2} \ 0 \ 0] \tag{111}$$

$$D_{21} = [0 \ D_{p21}] \tag{112}$$

$$D_{22}(X) = D_{p22}(X_p) \tag{113}$$

Next, in order to find a solution based on Riccati's equation, the state space expression of the generalized model expressed by the aforementioned formulas (98) through (101) is converted under the condition prescribed in a formula (114) shown below, whereby formulas (115) through (118) are established as shown below.

$$D_w D_{p12}(X) = 0 \tag{114}$$

$$X' = AX + B_1 w + B_2(X) u \tag{115}$$

$$Z_1 = a1(X, X\char`\^)C_{11}X \tag{116}$$

$$Z_2 = a2(X, X\char`\^)C_{12}X + a2(X, X\char`\^)D_{122}u \tag{117}$$

$$y = C_2 X + D_{21} w + D_{22}(X) u \tag{118}$$

As is the case with the aforementioned state feedback control system, for the aforementioned generalized model, an attempt is made to design a non-linear H∞ output feedback control rule u=k(y) which satisfies the condition (1) that the closed-loop system has a stable internal exponent and the condition (2) that the L2 gain from w to Z is equal to or smaller than a positive constant γ. Furthermore, in the following description, the non-linear H∞ output feedback control will be classified into first through third types.

c1-1) Designing Example of Control System of First Type

The first type refers to a case where $B_2(X)$ in the formula (106) and $D_{22}(X)$ in the formula (113) are known functions, that is, a case where at least the relative speed $(X_{pw}' - X_{pb}')$ is observable and the observer gain L is a constant matrix.

The aforementioned non-linear H∞ output feedback control rule u=k(y) can be obtained if the following conditions are established. That is, (1) if $D_{122}^{-1}$ exists, $\gamma_1$ is a positive constant satisfying $\gamma_1^2 I - D_{21}^T \Theta^T \Theta D_{12} > 0$, $\gamma_2 > 1$, and positive definite symmetric matrices P, Q and a positive definite matrix Θ satisfying Riccati's inequality for designing an observer (observer gain) of an after-mentioned formula (119) and Riccati's inequality for designing a controller (control apparatus) of an after-mentioned formula (120) exist, and (2) if the non-linear weights a1(X, X^) and a2(X, X^) satisfy a restrictive condition expressed by formulas (121) and (122) shown below, one of the control rules according to an after-mentioned formula (123) is given by formulas (124) and (125) shown below.

$$AQ + QA^T + Q(C_{11}^T C_{11} + C_{12}^T C_{12} - C_2^T \Theta^T \Theta C_2) Q + B_1(\gamma_1^2 I - D_{21}^T \Theta^T \Theta D_{21})^{-1} B_1^T < 0 \tag{119}$$

$$PA + A^T P + \frac{1}{\gamma_2^2} P L \Theta^{-1} \Theta^{-T} L^T P + \frac{\gamma_2^2}{\gamma_2^2 - 1}(C_{11}^T C_{11} + C_{12}^T C_{12}) < 0 \tag{120}$$

$$\gamma_2^2 - a1(X, X\char`\^)^2 > 0, \quad \gamma_2^2 - a2(X, X\char`\^)^2 > 0 \tag{121}$$

$$\left[\frac{\gamma_2^2}{\gamma_2^2 - 1} - \frac{a1(X, X\char`\^)^2 \gamma_2^2}{\gamma_2^2 - a1(X, X\char`\^)^2}\right] X^{\char`\^ T} C_{11}^T C_{11} X^\char`\^ + \left[\frac{\gamma_2^2 - a2(X, X\char`\^)^2}{a2(X, X\char`\^)^2 \gamma_2^2} - \frac{\gamma_2^2 - 1}{\gamma_2^2}\right] \times X^{\char`\^ T} \tag{122}$$

$$PB_2(X) D_{122}^{-1} D_{122}^{-T} B_2^T(X) PX^\char`\^ \geq 0$$

$$\left\|\begin{bmatrix} Z1 \\ Z2 \end{bmatrix}\right\|_2 \leq \gamma_1 \gamma_2 \|W\|_2 \tag{123}$$

$$X\char`\^' = (A + LC_2) X\char`\^ + (B_2(X) + LD_{22}(X)) u - Ly \tag{124}$$

$$u = -D_{122}^{-1} \times \left[\frac{\gamma_2^2 - a2(X, X\char`\^)^2}{a2(X, X\char`\^)^2 \gamma_2^2} D_{122}^{-T} B_2^T(X) P + C_{12}\right] X^\char`\^ \tag{125}$$

The observer gain L is expressed by a formula (126) shown below.

$$L = -QC_2^T \Theta^T \Theta \tag{126}$$

The sign "∥ ∥" denotes a Euclid-norm, and the sign "∥ ∥$_2$" denotes a norm in a square integrable function space $L_2$ and is defined by an after-mentioned formula (127) for f(t)∈$L_2$.

$$\|f(t)\|_2 = \left(\int_{t_0}^{\infty} \|f(t)\|^2 \, dt\right)^{1/2} \tag{127}$$

Θ is a positive definite matrix and $\Theta^{-1}$ exists. The use of Θ permits adjustment of the observer gain L. As is the case with the aforementioned state feedback control rule, the gain L of the controller can be adjusted using $D_{122}$. Furthermore, $\gamma_1$ is an L2 gain of the observer and $\gamma_2$ is an L2 gain of the controller. An L2 gain of the closed-loop system is determined as a product of $\gamma_1$ and $\gamma_2$. Accordingly, the L2 gain of the system must be determined by suitably adjusting the observer and the controller.

The non-linear weights a1(X, X^) and a2(X, X^) satisfying the restrictive conditions of the aforementioned formulas (121) and (122) respectively are exemplified below.

$$a1(X, X\char`\^) = (\gamma_2^2 + (\gamma_2^2 - 1)\gamma_2^2 \epsilon m_1(X, X\char`\^) X^{\char`\^ T} \times$$
$$PB_2(X) D_{122}^{-1} D_{122}^{-T} B_2^T(X) PX\char`\^)^{1/2} / (\gamma_2^2 +$$
$$(\gamma_2^2 - 1) m_1(X, X\char`\^) X^{\char`\^ T} \times PB_2(X) D_{122}^{-1} D_{122}^{-T} B_2^T(X) PX\char`\^)^{1/2} \tag{128}$$

$$a2(X, X\char`\^) = \sqrt{\frac{1}{1 + m_1(X, X\char`\^) X^{\char`\^ T} C_{11}^T C_{11} X^\char`\^}} \tag{129}$$

In the aforementioned formulas (128) and (129), m1(X, X^) is an arbitrary positive definite function, and ϵ is a positive constant satisfying inequalities ϵ<1 and $\epsilon \gamma_2^2 > 1$. As a result of calculations made by the computer, it has been made possible to find the positive definite symmetric solution P as described above. Using the aforementioned formulas (128) and (129), the aforementioned formulas (124) and (125) are respectively converted into formulas (130) and (131) shown below.

$$X\char`\^' = (A + LC_2) X\char`\^ + (B_2(X) + LD_{22}(X)) u - Ly \tag{130}$$

$$u = -D_{122}^{-1} \times \left[\frac{\gamma_2^2 - 1 + \gamma_2^2 m_1(X, X\char`\^) X^{\char`\^ T} C_{11}^T C_{11} X^\char`\^}{\gamma_2^2} X^\char`\^ \times \right.$$
$$\left. D_{122}^{-T} B_2^T(X) P + C_{12}\right] X^\char`\^ \tag{131}$$

Consequently, also in this case, a solution can easily be found by means of a known software in the same manner as in the case of the aforementioned state feedback control system. Therefore, this method makes it possible to easily find the positive definite symmetric solution P and to derive the estimated state quantity X^ and the control rule u=k(y).

c1-2) Calculation Example of First Type

Next, a calculation example of the first target damping force Fd using the aforementioned control rule of the first type will be described. In this case, the tire displacement amount sensor 25 (the tire displacement amount sensors 25a, 25b, 25c and 25d in FIG. 1) and the unsprung mass acceleration sensor 26 (the unsprung mass acceleration sensors 26a, 26b, 26c and 26d in FIG. 1) are omitted, and the microcomputer executes a first damping force calculating routine shown in FIG. 17 instead of the first damping force calculating routine shown in FIG. 15. In other respects, this example is identical to the aforementioned first modification.

Figure 17:
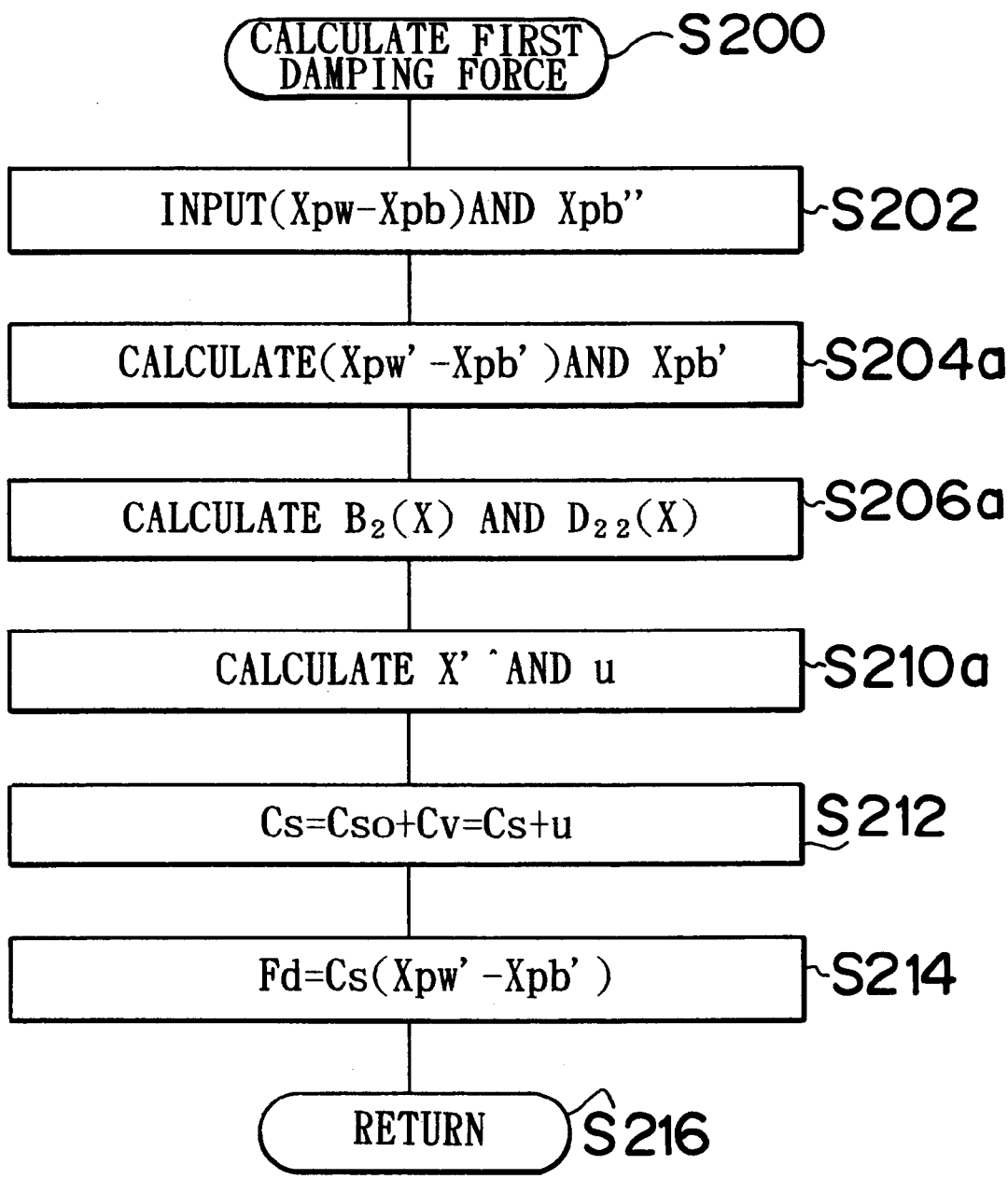
FIG. 17 is a flowchart of a first damping force calculating routine according to second and third modifications for calculating the first target damping force.

Also in this case, the execution of the first damping force calculating routine in FIG. 17 is started in step 200. In step 202a, detection signals indicative of a relative displacement amount ($X_{pw}-X_{pb}$) and a sprung mass acceleration $X_{pb}''$ are inputted from the relative displacement amount sensor 22 and the sprung mass acceleration sensor 21 respectively. In step 204a, as is the case with the aforementioned first modification example, a relative speed ($X_{pw}'-X_{pb}'$) and a sprung mass speed $X_{pb}'$ are calculated.

Next in step 206a, $B_{p2}(X_p)$ and $D_{p12}(X_p)$ are calculated according to after-mentioned formulas (132) and (133), which are identical to the aforementioned formulas (32) and (38) using the relative speed ($X_{pw}'-X_{pb}'$). $B_2(X)$ is then calculated according to an after-mentioned formula (134), which is identical to the aforementioned formula (106) using $B_{p2}(X_p)$ and $D_{p12}(X_p)$. $D_{22}(X)$ is calculated according to after-mentioned formulas (135) and (136), which are identical to the aforementioned formulas (41) and (113) using the relative speed ($X_{pw}'-X_{pb}'$).

$$B_{p2}(X_p) = \begin{bmatrix} 0 \\ 0 \\ -(X_{pw}' - X_{pb}')/M_w \\ (X_{pw}' - X_{pb}')/M_b \end{bmatrix} \quad (132)$$

$$D_{p12}(X_p) = \begin{bmatrix} (X_{pw}' - X_{pb}')/M_b \\ 0 \\ 0 \end{bmatrix} \quad (133)$$

$$B_2(X) = \begin{bmatrix} B_{p2}(X_p) \\ B_w D_{p12}(X_p) \\ B_u \end{bmatrix} \quad (134)$$

$$D_{p22}(X_p) = \begin{bmatrix} (X_{pw}' - X_{pb}')/M_b \\ 0 \end{bmatrix} \quad (135)$$

$$D_{22}(X) = D_{p22}(X_p) \quad (136)$$

In the aforementioned formulas (132) through (135), $M_w$, $M_b$, $B_w$ and $B_u$ denote the same values or constant matrices as in the aforementioned first modification example.

After the aforementioned processing of step 206a, an estimated state quantity $X^\wedge$ and a control input u are calculated using formulas (137) and (138) which are identical to the aforementioned formulas (130) and (131), in the same manner as in the aforementioned first modification example.

$$X^{\wedge\prime}=(A+LC_2)X^\wedge+(B_2(X)+LD_{22}(X))u-Ly \quad (137)$$

$$u = -D_{122}^{-1} \times \left[ \frac{\gamma_2^2 - 1 + \gamma_2^2 m_1(X, X^\wedge)X^{\wedge T}C_{11}^T C_{11} X^\wedge}{\gamma_2^2} X^\wedge \times \right. \\ \left. D_{122}^{-T} B_2^T(X)P + C_{12} \right] X^\wedge \quad (138)$$

In the aforementioned formula (137), A is a constant matrix that is preliminarily stored in the microcomputer and determined by the aforementioned formulas (104), (30) and (37). L is a constant matrix that is preliminarily stored in the microcomputer and defined by the aforementioned formula (126), and is a gain of the observer that is determined by the positive definite symmetric matrix Q, the constant matrix $C_2$ determined by the aforementioned formulas (39) and (111), and the positive definite matrix $\Theta$. $C_2$ is also the aforementioned constant matrix that is preliminarily stored in the microcomputer. $B_2(X)$ and $D_{22}(X)$ are matrices calculated in the aforementioned step 206a. Further, y is an observed value which represents, in the first type, the relative displacement amount ($X_{pw}-X_{pb}$) inputted through the processing of the aforementioned step 202a and the sprung mass speed $X_{pb}'$ calculated through the processing of the aforementioned step 204a.

In the aforementioned formula (138), $D_{122}$ is a coefficient matrix that is defined by the aforementioned formula (110) and relates to the frequency weight $W_u(S)$ set in the aforementioned formula (48), and is a constant matrix that is preliminarily stored in the microcomputer. $\gamma_2$ is a positive constant satisfying the aforementioned inequality $\gamma_2 > 1$. $m1(X, X^\wedge)$ is an arbitrary positive definite function, and an algorithm concerning the function is preliminarily stored in the microcomputer. The positive definite function $m1(X)$ may be set to a positive constant, for example, "1.0". $C_{11}$ is defined by the aforementioned formulas (37) and (107). In other words, $C_{11}$ is a constant matrix which is preliminarily stored in the microcomputer and which is defined by the mass $M_w$ of the wheel WH, the mass $M_b$ of the vehicle body BD, the spring constant $K_s$ of the spring 11, the linear damping coefficient $C_{S0}$ of the damper 12 and the coefficient matrices $C_w$ and $D_w$ relating to the frequency weight $W_s(S)$ set in the aforementioned formula (46). $B_2(X)$ is a matrix calculated in the aforementioned step 206a. P is a positive definite symmetric solution satisfying the aforementioned formulas (119) and (120) and is a constant matrix that is preliminarily stored in the microcomputer. $C_{12}$, which is defined by the aforementioned formula (109), is a constant matrix that includes the coefficient matrix $C_u$ relating to the frequency weight $W_u(S)$ set in the aforementioned formula (48) and is preliminarily stored in the microcomputer.

After the processing of the aforementioned step 210a, through processings of the same steps 212 and 214 as in the first modification example, an overall target damping coefficient $C_s$ of the damper 12 and a first target damping force Fd are calculated. In step 216, the execution of the first damping force calculating routine is terminated.

c2-1) Designing Example of Control System of Second Type

The second type refers to a case where $B_2(X)$ in the aforementioned formula (106) and $D_{22}(X)$ in the aforementioned formula (113) are unknown functions, that is, a case where the relative speed ($X_{pw}'-X_{pb}'$) is unknown and the observer gain L is a constant matrix.

In a bilinear system of this kind, $B_2(X)$ and $D_{22}(X)$ are linear functions of X. In consideration of this, the generalized model expressed by the aforementioned formulas (115) through (118) is rewritten, whereby formulas (139) through (142) are established as shown below. It is to be noted herein that $B_{20}$, $D_{220}$ and $d_{122}$ are constant matrices.

$$X'=AX+B_1w+B_{20}X_u \quad (139)$$

$$Z_1=a1(X^\wedge)C_{11}X \quad (140)$$

$$Z_2=a2(X^\wedge)C_{12}X+a2(X)d_{122}u \quad (141)$$

$$y=C_2X+D_{21}W+D_{220}X_u \quad (142)$$

An attempt will be made to design a non-linear H∞ output feedback control rule for this generalized model. In the case where the observer gain L is given as a constant matrix, an output feedback control rule can be designed according to the following theorem. That is (1) if, given that $\gamma_1$ is a positive constant satisfying an inequality $\gamma_1^2 I-$ $D_{21}{}^T\Theta^T\Theta D_{12}>0$, that $\gamma_2$ is a positive constant satisfying an inequality $\gamma_2>1$ and that a positive constant $\epsilon$ satisfying an inequality $\epsilon_I{}^2-u^2>0$ exists, positive definite symmetric matrices P and Q and a positive definite matrix $\Theta$ which satisfy Riccati's inequality for designing the observer (observer gain) of an after-mentioned formula (143) and Riccati's inequality for designing the controller of an after-mentioned formula (144) exist, and (2) if the non-linear weights a1(X, X^) and a2(X, X^) satisfy restrictive conditions prescribed in formulas (145) and (146) shown below, one of the control rules according to an after-mentioned formula (147) is given by formulas (148) and (149) shown below.

$$AQ+QA^T+Q(C_{11}{}^TC_{11}+C_{12}{}^TC_{12}-C_2{}^T\Theta\Theta C_2+$$

$$\epsilon^2I+\epsilon_1{}^2D_{220}{}^T\Theta^T(I+\Theta D_{21}\times(\gamma_1{}^2I-D_{21}{}^T\Theta^T\Theta$$

$$D_{21})^{-1}D_{21}{}^T\Theta^T)\Theta D_{220})Q+B_1(\gamma_1{}^2I-D_{21}{}^T\Theta^T\Theta D_{21})^{-1}B_1{}^T+$$

$$(B_1(\gamma_1{}^2I-D_{21}{}^T\Theta^T\Theta D_{21})^{-1}D_{21}{}^T\Theta^T\Theta D_{220}+B_{20})\times$$

$$(D_{220}{}^T\Theta^T\Theta D_{21}(\gamma_1{}^2I-D_{21}{}^T\Theta^T\Theta D_{21})^{-1}B1^T+B_{20}{}^T)<0 \quad (143)$$

$$PA+A^TP+\frac{1}{\gamma_2^2}PL\Theta^{-1}\Theta^{-T}L^TP+\frac{\gamma_2^2}{\gamma_2^2-1}(C_{11}^TC_{11}+C_{12}^TC_{12})<0 \quad (144)$$

$$\gamma_2{}^2-a1(X, X^{\wedge})^2>0, \gamma_2{}^2-a2(X, X^{\wedge})^2>0 \quad (145)$$

$$\left[\frac{\gamma_2^2}{\gamma_2^2-1}-\right. \quad (146)$$

$$\left.\frac{(a1(X, X^\wedge))^2\gamma_2^2}{\gamma_2^2-(a1(X, X^\wedge))^2}\right]X^{\wedge T}C_{11}^TC_{11}X^\wedge + \left[\frac{\gamma_2^2-(a2(X, X^\wedge))^2}{(a2(X, X^\wedge))^2\gamma_2^2}-\right.$$

$$\left.\frac{\gamma_2^2-1}{\gamma_2^2}\right]\frac{1}{d_{122}^2}\times X^{\wedge T}PB_{20}X^\wedge X^{\wedge T}B_{20}^TPX^\wedge \geq 0$$

$$\|[Z_1^T\ Z_2^T]^T\|_2 \leq \gamma_1\gamma_2\|W\|_2 \quad (147)$$

$$X'^{\wedge}=(A+L(u)C_2)X^{\wedge}+(B_{20}+L(u)D_{220})X^{\wedge}u-L(u)y \quad (148)$$

$$u = -\frac{1}{d_{122}}\times\left[\frac{\gamma_2^2-a2(X, X^\wedge)^2}{a2(X, X^\wedge)^2\gamma_2^2d_{122}}X^{\wedge T}B_{20}^TP+C_{12}\right]X^\wedge \quad (149)$$

The observer gain L(u) is expressed by a formula (150) shown below.

$$L(u)=-QC_2{}^T\Theta^T\Theta \quad (150)$$

$\Theta$ is a positive definite matrix and $\Theta^{-1}$ exists. The use of $\Theta$ permits adjustment of the observer gain L(u). As is the case with the aforementioned state feedback control rule, the gain L of the controller can be adjusted using $d_{122}$.

The non-linear weights a1(X, X^) and a2(X, X^) satisfying the restrictive conditions of the aforementioned formulas (145) and (146) respectively are exemplified in formulas (151) and (152) shown below.

$$a1(X, X^{\wedge})=(\gamma_2{}^2d_{122}{}^2+(\gamma_2{}^2-1)\gamma_2{}^2\epsilon\ m1(X, X^{\wedge})\times$$

$$X^{\wedge T}PB_{20}X^{\wedge}X^{\wedge T}B_{20}{}^TPX^{\wedge})^{1/2}/(\gamma_2{}^2d_{122}{}^2+$$

$$(\gamma_2{}^2-1)m1(X, X^{\wedge})\times X^{\wedge T}PB_{20}X^{\wedge}X^{\wedge T}B_{20}{}^TPX^{\wedge})^{1/2} \quad (151)$$

$$a2(X, X^\wedge) = \sqrt{\frac{1}{1+m1(X, X^\wedge)X^{\wedge T}C_{11}^TC_{11}X^\wedge}} \quad (152)$$

In the aforementioned formulas (151) and (152), m1(X, X^) is an arbitrary positive definite function, and $\epsilon$ is a positive constant satisfying inequalities $\epsilon<1$ and $\epsilon\gamma_2{}^2>1$. As a result of calculations made by the computer, it has been made possible to find the positive definite symmetric solution P as described above. Using the aforementioned formulas (151) and (152), the aforementioned formulas (148) and (149) are respectively converted into formulas (153) and (154) shown below.

$$X'^{\wedge}=(A+L(u)C_2)X^{\wedge}+(B_{20}+L(u)D_{220})X^{\wedge}u-L(u)y \quad (153)$$

$$u = \quad (154)$$

$$-\frac{1}{d_{122}}\times\left[\frac{\gamma_2^2-1+\gamma_2^2m_1(X, X^\wedge)X^{\wedge T}C_{11}^TC_{11}X^\wedge}{d_{122}\gamma_2^2}\times B_{20}^TP+C_{12}\right]X^\wedge$$

Consequently, also in this case, a solution can easily be found by means of a known software in the same manner as in the case of the aforementioned state feedback control system. Therefore, this method makes it possible to easily find the positive definite symmetric solution P and to derive the estimated state quantity X'^ and the control rule u=k(y).

c2-2) Calculation Example of Second Type

Next, a calculation example of the first target damping force Fd using the control rule of the second type will be described. In this case, the relative displacement amount sensor 22 of the first type shown in FIG. 6 (the relative displacement amount sensors 22a, 22b, 22c and 22d shown in FIG. 1) is omitted. The inputting of the relative displacement amount ($X_{pw}-X_{pb}$) from the relative displacement amount sensor 22 in step 202a of FIG. 17, the calculation of the relative speed ($X_{pw}'-X_{pb}'$) in step 204a of FIG. 17, and the arithmetic processing in step 206a are omitted. Then calculations are made according to the aforementioned control rule of the second type.

Also in this case, the execution of the first damping force calculating routine in FIG. 17 is started in step 200. A sprung mass acceleration $X_{pb}''$ is inputted in step 202a, and a sprung mass speed $X_{pb}'$ is calculated in step 204a. In step 210a, a control input u and an estimated state quantity X'^ including an estimation of the relative speed ($X_{pw}'-X_{pb}'$) are calculated using formulas (155) and (156) which are identical to the aforementioned formulas (153) and (154) respectively.

$$X'^{\wedge}=(A+L(u)C_2)X^{\wedge}+(B_{20}+L(u)D_{220})X^{\wedge}u-L(u)y \quad (155)$$

$$u = \quad (156)$$

$$-\frac{1}{d_{122}}\times\left[\frac{\gamma_2^2-1+\gamma_2^2m_1(X, X^\wedge)X^{\wedge T}C_{11}^TC_{11}X^\wedge}{d_{122}\gamma_2^2}\times B_{20}^TP+C_{12}\right]X^\wedge$$

In the aforementioned formulas (155) and (156), A, L, $C_2$, T2, m1(X, X^), $C_{11}$, P and $C_{12}$ are the same as in the case of the first type. $B_{20}$, $D_{220}$, $d_{122}$ are the aforementioned appropriate matrices that are preliminarily stored in the microcomputer. In this case, y is an observed value which represents the sprung mass speed $X_{pb}'$ calculated through the aforementioned processing of step 204a.

After the aforementioned processing of step 210a, through the processings of steps 212 and 214 substantially identical to those of the first type, an overall damping force $C_s$ of the damper 12 is calculated and a first target damping force Fd is calculated. In this case, when calculating the first target damping force Fd in step 214, the estimated relative speed $(X_{pw}{}'^{\wedge}-X_{pb}{}'^{\wedge})$ calculated in step 210a is utilized.

c3-1) Designing Example of Control System of Third Type

The third type also refers to a case where $B_2(X)$ in the aforementioned formula (106) and $D_{22}(X)$ in the aforementioned formula (113) are unknown functions, that is, a case where the relative speed $(X_{pw}{}'-X_{pb}{}')$ is unknown and the observer gain L is a function matrix.

Also in the third type, an attempt will be made to design a non-linear H∞ output feedback control rule for the generalized model expressed by the aforementioned formulas (139) through (142) of the second type. In the case where the observer gain L is given as a function of the control input u, an output feedback control rule can be designed according to the following theorem. That is (1) if, given that $\gamma_1$ is a positive constant satisfying an inequality $\gamma_1{}^2 I - D_{21}{}^T \Theta^T \Theta D_{12} > 0$, that $\gamma_2$ is a positive constant satisfying an inequality $\gamma_2 > 1$ and that a positive constant $\epsilon$ satisfying an inequality $\epsilon_1{}^2 - u^2 > 0$ exists, positive definite symmetric matrices P and Q and a positive definite matrix $\Theta$ which satisfy Riccati's inequality for designing the observer (observer gain) of an after-mentioned formula (157) and Riccati's inequality for designing the controller of an after-mentioned formula (158) exist, and (2) if the non-linear weights a1(X, X^) and a2(X, X^) satisfy restrictive conditions prescribed in formulas (159) and (160) shown below, one of the control rules according to an after-mentioned formula (161) is given by formulas (162) and (163) shown below.

$$AQ+QA^T+Q(C_{11}{}^T C_{11}+C_{12}{}^T C_{12}+\epsilon^2 I)Q+B_1(\gamma_1{}^2 I-D_{21}{}^T\Theta^T\Theta D_{21})^{-1}B_1{}^T+B_{20}B_{20}{}^T<0 \quad (157)$$

$$PA+A^TP+\frac{1}{\gamma_2^2}PL_1\Theta^{-1}\Theta^{-T}L_1^T P+ \quad (158)$$
$$\frac{\epsilon_1^2 d_{122}^2}{\gamma_2^2}PL_2\Theta^{-1}\Theta^{-T}L_2^T P+\frac{\gamma_2^2}{\gamma_2^2-1}(C_{11}^T C_{11}+C_{12}^T C_{12})<0$$

$$\gamma_2{}^2-a1(X,X^{\wedge})^2>0,\ \gamma_2{}^2-a2(X,X^{\wedge})^2>0 \quad (159)$$

$$\left[\frac{\gamma_2^2-a2(X,X^{\wedge})^2}{a2(X,X^{\wedge})^2\gamma_2^2}-\frac{\gamma_2^2-1}{\gamma_2^2}\right]\frac{1}{d_{122}^2}X^{\wedge T}P\times \quad (160)$$
$$(B_{20}+L_4\Theta^{-1}\Theta^{-T}L_2^TP)X^{\wedge}\times$$
$$X^{\wedge T}(B_{20}^T+PL_2\Theta^{-1}\Theta^{-T}L_1^T)PX^{\wedge}+\left[\frac{\gamma_2^2}{\gamma_2^2-1}-\frac{a1(X,X^{\wedge})^2\gamma_2^2}{\gamma_2^2-a1(X,X^{\wedge})^2}\right]X^{\wedge T}C_{11}^T C_{11}X^{\wedge}\geq 0$$

$$\|[Z_1{}^T\ Z_2{}^T]^T\|_2\leq\gamma_1\gamma_2\|W\|_2 \quad (161)$$

$$X^{\wedge\prime}=(A+L_1 C_2)X^{\wedge}+(B_{20}+L_2 D_{220})X^{\wedge}u-(L_1+L_2 u)y \quad (162)$$

$$u=-\frac{1}{d_{122}}\times\left[\frac{\gamma_2^2-a_2(X,X^{\wedge})^2}{a_2(X,X^{\wedge})^2\gamma_2^2 d_{122}}\right]X^{\wedge T}\times \quad (163)$$
$$\left(B_{20}^T P+\frac{1}{\gamma_2^2}PL_1\Theta^{-1}\Theta^{-T}L_2^T P\right)+C_{12}\Bigg]X^{\wedge}$$

The observer L(u) is expressed by a formula (164) shown below.

$$L(u)=-QC_2{}^T\Theta^T\Theta-uQD_{220}{}^T\Theta^T\Theta=L_1+uL_2 \quad (164)$$

$L_1$ and $L_2$ shown in the aforementioned formula (164) are respectively expressed by formulas (165) and (166) shown below.

$$L_1=-QC_2{}^T\Theta^T\Theta \quad (165)$$

$$L_2=-QD_{220}{}^T\Theta^T\Theta \quad (166)$$

$\Theta$ is a positive definite matrix and $\Theta^{-1}$ exists. The use of $\Theta$ permits adjustment of the observer gain L. As is the case with the aforementioned state feedback control rule, the gain L of the controller can be adjusted using $d_{122}$.

The non-linear weights a1(X, X^) and a2(X, X^) satisfying the restrictive conditions of the aforementioned formulas (159) and (160) respectively are exemplified respectively in formulas (167) and (168) shown below.

$$a1(X,X^{\wedge})=(\gamma_2^2 d_{122}^2+(\gamma_2^2-1)\gamma_2^2\epsilon\ m1(X,X^{\wedge})X^{\wedge T}P\times$$
$$(B_{20}+L_1\Theta^{-1}\Theta^{-T}L_2^T P)X^{\wedge}X^{\wedge T}\times$$
$$(B_{20}^T+PL_2\Theta^{-1}\Theta^{-T}L_1^T)PX^{\wedge})^{1/2}/(\gamma_2^2 d_{122}^2+(\gamma_2^2-1)m1(X,X^{\wedge})X^{\wedge T}P\times$$
$$(B_{20}+L_1\Theta^{-1}\Theta^{-T}L_2^T P)X^{\wedge}X^{\wedge T}\times(B_{20}^T+PL_2\Theta^{-1}\Theta^{-T}L_1^T)PX^{\wedge})^{1/2} \quad (167)$$

$$a2(X,X^{\wedge})=\sqrt{\frac{1}{1+m1(X,X^{\wedge})X^{\wedge T}C_{11}^T C_{11}X^{\wedge}}} \quad (168)$$

In the aforementioned formulas (167) and (168), m1(X, X^) is an arbitrary positive definite function, and $\epsilon$ is a positive constant satisfying inequalities $\epsilon<1$ and $\epsilon\gamma_2{}^2>1$. As a result of calculations made by the computer, it has been made possible to find the positive definite symmetric solution P as described above. Using the aforementioned formulas (167) and (168), the aforementioned formulas (162) and (163) are respectively converted into formulas (169) and (170) shown below.

$$X^{\wedge\prime}=(A+L_1 C_2)X^{\wedge}+(B_2 X^{\wedge}+L_2 D_{22}X^{\wedge})u-L(u)y \quad (169)$$

$$u=-\frac{\gamma_2^2-1+\gamma_2^2 m_1(X,X^{\wedge})X^{\wedge T}C_{11}^T C_{11}X^{\wedge}}{d_{122}^2\gamma_2^2}\times \quad (170)$$
$$\left(B_{20}^T+\frac{1}{\gamma_2^2}PL_1\Theta^{-1}\Theta^{-T}L_2^T\right)PX^{\wedge}-\frac{1}{d_{122}}C_{12}X^{\wedge}$$

Consequently, also in this case, a solution can easily be found by means of a known software in the same manner as in the case of the aforementioned state feedback control system. Therefore, this method makes it possible to easily find the positive definite symmetric solution P and to derive the estimated state quantity X'^ and the control rule u=k(y).

c3-2) Calculation Example of Third Type

Next, a calculation example of the first target damping force Fd using the control rule of the third type will be described. In this case, the construction is the same as in the aforementioned case of the second type.

Also in this case, the execution of the first damping force calculating routine is started in step 200. After processings in steps 202a and 204a which are substantially identical to those of the aforementioned first type, an estimated state quantity $X'^{\wedge}$ and a control input u are calculated using formulas (171) and (172) which are identical to the aforementioned formulas (169) and (170), in the same manner as in the aforementioned case of the second type.

$$X'^{\wedge}=(A+L_1C_2)X^{\wedge} \times (B_2X^{\wedge}+L_2D_{22}X^{\wedge})u-L(u)y \qquad (171)$$

$$u = -\frac{\gamma_2^2 - 1 + \gamma_2^2 m_1(X, X^{\wedge})X^{\wedge T}C_{11}^T C_{11}X^{\wedge}}{d_{122}^2 \gamma_2^2} \times \left(B_{20}^T + \frac{1}{\gamma_2^2}PL_1\Theta^{-1}\Theta^{-T}L_2^T\right)PX^{\wedge} - \frac{1}{d_{122}}C_{12}X^{\wedge} \qquad (172)$$

In the aforementioned formulas (171) and (172), A, $C_2$, $B_{20}$, $D_{220}$, $\gamma_2$, $m1(X, X^{\wedge})$, $C_{11}$, $d_{122}$, P, $C_{12}$ are the same as those in the aforementioned case of the second type. L, $L_1$ and L2 are gains defined by the aforementioned formulas (164) through (166). Furthermore, also in this case, y is an observed value which represents the sprung mass speed $X_{pb}'$ calculated through the aforementioned processing of step 204a.

After the aforementioned processing in step 210a, through the processings of steps 212 and 214 substantially identical to those of the second type, an overall damping force $C_s$ of the damper 12 is calculated and a first target damping force Fd is calculated. In step 216, the execution of the first damping force calculating routine is terminated.

d. Third Modification d1. Designing Example of Non-Linear H∞ Control System of Kalman Filter Base For the aforementioned model marked with a, an attempt will be made to design an output feedback system which employs a Kalman filter as an observer, on the condition that the bilinear terms $B_{p2}(X_p)$ and $D_{p2}(X_p)$ be known, namely, that the relative speed $(X_{pw}'-X_{pb}')$ be observable.

In the third modification, the same reference characters as in the aforementioned case of the second modification are used, and the coefficients and variables concerning the model are accompanied by a suffix p. A state space expression of the suspension system is indicated by formulas (173) and (174) shown below.

$$X_p'=A_pX_p+B_{p1}w_1+B_{p2}(X_p)u \qquad (173)$$

$$y_p=C_pX_p+D_{p1}w_2+D_{p2}(X_p)u \qquad (174)$$

If $D_{p1}=I$, the Kalman filter in the case of t→∞ is expressed according to a formula (175) shown below.

$$X_0'=A_pX_0+B_{p2}u+K(C_pX_0+D_{p2}(X_p)u-y) \qquad (175)$$

$X_0$ and $X_0'$ are estimated state quantities in the Kalman filter, and the filter gain K is expressed by a formula (176) shown below.

$$K=-\Sigma C_p^T W^{-1} \qquad (176)$$

The estimated error covariance $\Sigma$ is a positive definite symmetric solution of Riccati's equation (177) shown below.

$$A_p\Sigma + \Sigma A_p^T + B_{p1}VB_{p1}^T - \Sigma C_p^T W^{-T} C_p\Sigma = 0 \qquad (177)$$

V is a covariance matrix of $w_1$, and W is a covariance matrix of $w_2$.

Figure 18:
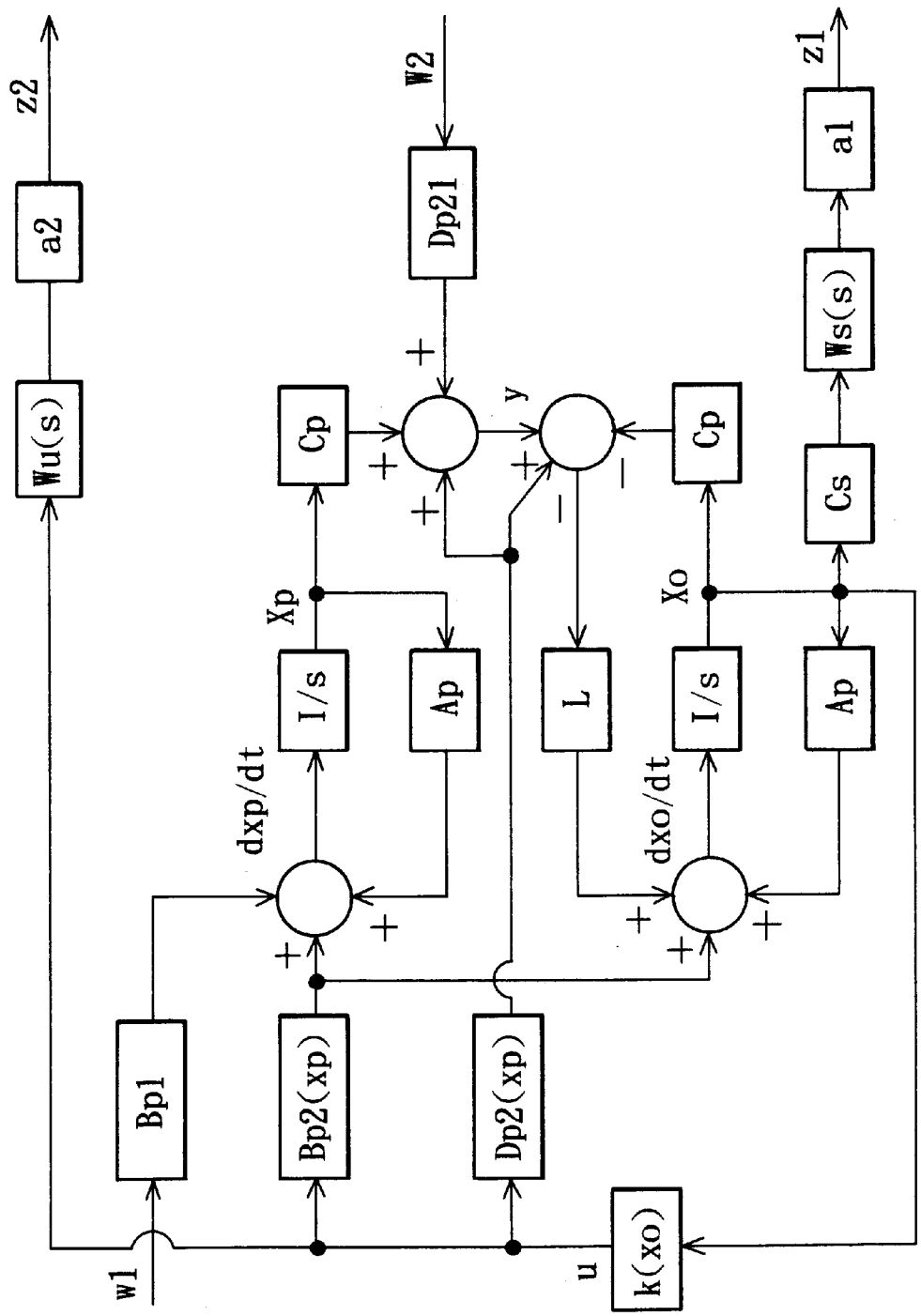
FIG. 18 is a block diagram of a generalized model of a non-linear H∞ control system based on a Kalman filter and relates to the third modification for calculating the first target damping force.

FIG. 18 shows a block diagram of a generalized model of this system. In this case, "a product obtained by multiplying the estimated state quantity $X_0$ by the frequency weight W(S)", which is an output from the observer, and "a product obtained by multiplying the control input u by the frequency $W_u(S)$" are used as evaluated outputs Z. In other words, the Kalman filter is used herein as a detector, and the control system is so designed as to reduce an output from the Kalman filter. The third modification is different from the aforementioned first and second modifications in this respect. However, if the state has been estimated successfully, it is considered that the performance equivalent to that of the first and second modifications will be obtained. A state space expression of the system indicated by the block diagram in FIG. 18 is expressed according to formulas (178) through (184) shown below.

$$X_p'=A_pX_p+B_{p1}w_1+B_{p2}(X_p)u \qquad (178)$$

$$X_0'=A_pX_0+B_{p2}(X_p)u+L(C_2X_0+D_{p2}(X_p)u-y) \qquad (179)$$

$$y=C_pX_p+D_{p1}w_2+D_{p2}(X_p)u \qquad (180)$$

$$X_w'=A_wX_w+B_wC_sX_0 \qquad (181)$$

$$Z_1=a1(X_p, X_0, X_w, X_u)(C_wX_w+D_wC_sX_0) \qquad (182)$$

$$X_u'=A_uX_u+B_uu \qquad (183)$$

$$Z_2=a2(X_p, X_0, X_w, X_u)(C_uX_u+D_uu) \qquad (184)$$

$X_p$ denotes a state quantity of the system, the formula (178) represents a state space expression of the system, $X_0$ denotes an estimated state quantity, the formula (179) represents a state space expression of the observer, y denotes an observed output, and $X_w$ denotes a state of frequency weight. Evaluated outputs $Z_1$ and $Z_2$ are to be weighted later with non-linear weights.

For this system, a control rule $u=k(X_0)$ which performs feedback control of a state of the observer satisfying the condition that the closed-loop system has a stable internal exponent and the condition that the L2 gain from w to Z is equal to or smaller than a positive constant γ is designed. As indicated by a formula (185) shown below, this system is characterized in that $X_0$ is an input for the frequency weight $W_s(S)$.

$$W_s(S): \begin{array}{l} X_w' = A_wX_w + B_wC_sX_0 \\ Z_1 = C_wX_w + D_wC_sX_0 \end{array} \qquad (185)$$

First of all, if the error variable is defined as in a formula (186) shown below, the error system is expressed according to formulas (187) and (188) shown below.

$$X_e=X_{p-X0} \qquad (186)$$

$$X_e'=(A_p+LC_p)X_e+B_{p1}w_1+LD_pw_2 \qquad (187)$$

$$y_e = y - C_pX_0 - D_{p2}(X_p)u \\ = C_pX_0 + D_{p1}w_2 \qquad (188)$$

Furthermore, the error system expressed by the aforementioned formulas (187) and (188) is converted by multiplying $y_e$ by a constant matrix Θ (a scaling matrix) which has its inverse matrix. The converted system is indicated by formulas (189) and (190) shown below.

$$X_{pe}'=(A_p+LC_p)X_{pe}+B_{p1}w_1+LD_pw_2 \qquad (189)$$

$$y_e^-=\Theta C_p X_e+\Theta D_{p1}w_2 \qquad (190)$$

For this converted error system, an attempt will be made to design an observer gain L such that a positive constant $\gamma_1$ exists and that the L2 gain from a disturbance input $w=[w_1^T \; w_2^T]$ to $y_e^-$ becomes equal to or smaller than $\gamma_1$ ($\|y_e^-\|_2 \leq \gamma_1 \|w\|_2$).

If it is assumed herein that $\gamma_1$ is a positive constant satisfying an inequality $\gamma_1 I - D_{p1}^T \Theta^T \Theta D_{p1} > 0$, the value of L for establishing $\|y_e^-\|_2 \leq \gamma_1 \|W\|_2$ is given by a formula (191) shown below.

$$L = -QC_p^T \Theta^T \Theta \qquad (191)$$

Q is a positive definite symmetric matrix satisfying Riccati's equation (192) shown below.

$$A_p Q + Q A_p^T + \frac{1}{\gamma_1} B_{p1} B_{p1}^T - QC_p^T \Theta^T \Theta C_p Q = 0 \qquad (192)$$

It is to be noted that the aforementioned Riccati's equation (192), which is to be solved herein, is an order of the model and is smaller than the order of the generalized models of the aforementioned first and second modifications.

The aforementioned formula (179) concerning the observer is then rewritten, so that a formula (193) shown below is obtained.

$$\begin{aligned} X_0' &= AX_0 + B_2(X_p)u + L(C_2 X_0 + D_{p2}(X_p)u - y) \\ &= AX_0 + B_2(X_p)u + L\Theta^{-1} y_e^{\wedge} \end{aligned} \qquad (193)$$

Using the observer expressed by this formula (193), an attempt will be made to design a controller such that a positive constant $\gamma_2$ exists and that the L2 gain from an observer error $y_e^{\wedge}$ to an evaluated output Z becomes equal to or smaller than $\gamma_2$ ($\|z\|_2 \leq \gamma_2 \|y_e^-\|_2$). If a generalized model which combines state variables $X_w$ and $X_u$ relating to frequency weights is constructed using the observer expressed by the aforementioned formula (193), a state space expression of the model is indicated by formulas (194) through (196) shown below.

$$X_k' = AX_k + B_2(X_p)u + L_1 \Theta^{-1} y_e^- \qquad (194)$$

$$Z^1 = a1(X_p, X_k)C_{11} X_k \qquad (195)$$

$$Z_2 = a2(X_p, X_k)C_{12} X_k + a2(X_p, X_k)D_{12}u \qquad (196)$$

The respective variable matrices and constant matrices in the aforementioned formulas (194) through (196) are expressed by formulas (197) through (204) shown below.

$$X_k = \begin{bmatrix} X_0 \\ X_w \\ X_u \end{bmatrix} \qquad (197)$$

$$A = \begin{bmatrix} A_p & 0 & 0 \\ B_w C_s & A_w & 0 \\ 0 & 0 & A_u \end{bmatrix} \qquad (198)$$

$$B_2(X_p) = \begin{bmatrix} B_{p2}(X_p) \\ 0 \\ B_u \end{bmatrix} \qquad (199)$$

$$L_1 = \begin{bmatrix} L \\ 0 \\ 0 \end{bmatrix} \qquad (200)$$

$$Z = \begin{bmatrix} Z_1 \\ Z_2 \end{bmatrix} \qquad (201)$$

$$C_{11} = [D_w C_s \; C_w \; 0] \qquad (202)$$

$$C_{12} = [0 \; 0 \; C_u] \qquad (203)$$

$$D_{12} = D_u \qquad (204)$$

The state quantity $X_k$ defined herein does not include the state quantity $X_p$.

At this moment, if it is assumed that $D_{12}^{-1}$ exists, a positive definite symmetric solution P of Riccati's inequality of an after-mentioned formula (205) exists. Furthermore, if the non-linear weights $a1(X_p, X_k)$ and $a2(X_p, X_k)$ satisfy a formula (206) shown below, a positive constant $\gamma_2$ exists and a controller for establishing $\|z\|_2 \leq \gamma_2 \|y_e\|_2$ is given by a formula (207) shown below.

$$PA + A^T P + \frac{PL\Theta^{-1}\Theta^{-T}L^T P}{\gamma_2^2} + C_{11}^T C_{11} + C_{12}^T C_{12} < 0 \qquad (205)$$

$$(1 - a1(X_p, X_k)^2)X_k^T C_{11}^T C_{11} X_k + \left[\frac{1}{a2(X_p, X_k)^2} - 1\right] \times \\ X_k^T PB_2(X_p)D_{12}^{-1}D_{12}^{-T}B_2^T(X_p)PX_k \geq 0 \qquad (206)$$

$$u = -D_{12}^{-1}\left[\frac{1}{a2(X_p, X_k)^2}D_{12}^{-1}B_2^T(X_p)P + C_{12}\right]X \qquad (207)$$

Accordingly, it is possible to design an observer and a controller that satisfy formulas (208) and (209) shown below.

$$\|y_e^-\|_2 \leq \gamma_1 \|W\|_2 \qquad (208)$$

$$\|Z\|_2 \leq \gamma_2 \|y_e^-\|_2 \qquad (209)$$

This reveals that positive definite symmetric matrices Q and P satisfying Riccati's equation and inequality (210) and (211) shown below exist.

$$A_p Q + Q A_p^T + \frac{1}{\gamma_1} B_{p1} B_{p1}^T - QC_p^T \Theta^T \Theta C_p Q = 0 \qquad (210)$$

$$PA + A^T P + \frac{PL\Theta^{-1}\Theta^{-T}L^T P}{\gamma_2^2} + C_{11}^T C_{11} + C_{12}^T C_{12} < 0 \qquad (211)$$

Then if the non-linear weights $a1(X_p, X_k)$ and $a2(X_p, X_k)$ satisfy a restrictive condition of a formula (212) shown below, a control rule according to an after-mentioned formula (213) is given by formulas (214) and (215) shown below.

$$(1 - a1(X_p, X_k)^2)X_k^T C_{11}^T C_{11} X_k + \left[\frac{1}{a2(X_p, X_k)^2} - 1\right] \times \\ X_k^T PB_2(X_p)D_{12}^{-1}D_{12}^{-T}B_2^T(X_p)PX_k \geq 0 \qquad (212)$$

$$\|Z\|_2 \leq \gamma_1 \gamma_2 \|W\|_2 \qquad (213)$$

$$X_k'=(A+L_1C_2)X_k+(B_2(X_p)+L_1D_{p2}(X_p))u-L_1y \quad (214)$$

$$u = -D_{12}^{-1}\left[\frac{1}{a2(X_p, X_k)^2}D_{12}^{-T}B_2^T(X_p)P + C_{12}\right]X_k \quad (215)$$

Riccati's equation of the aforementioned formula (177) that has been used to design the Kalman filter is herein compared with Riccati's equation of the aforementioned formula (192). If covariance matrices V and W are defined by formulas (216) and (217) shown below, positive definite solutions Σ and Q of both Riccati's equations coincide with each other.

$$W^{-1}=\Theta^T\Theta \quad (216)$$

$$V = \frac{1}{\gamma_1^2}I \quad (217)$$

That is, if Θ and $\gamma_1$ satisfying the aforementioned formulas (216) and (217) are selected by means of the covariance matrices V and W that have been used to design the Kalman filter, the observer that is designed herein and expressed by an after-mentioned formula (218) coincides with the Kalman filter.

$$X_0'=AX_0+B_2(X_p)u+L(C_2X_0+D_{p2}(X_p)u-y) \quad (218)$$

The non-linear weights $a1(X_p, X_k)$ and $a2(X_p, X_k)$ satisfying the restrictive condition of the aforementioned formula (212) are respectively exemplified in formulas (219) and (220) shown below.

$$a1(X_p, X_k) = \sqrt{1 + m1(X_p, X_k)X_k^T PB_2(X_p)D_{122}^{-1}D_{122}^{-T}B_2^T(X_p)PX_k} \quad (219)$$

$$a2(X_p, X_k) = \sqrt{\frac{1}{1 + m1(X_p, X_k)X_k^T C_{11}^T C_{11} X_k}} \quad (220)$$

In the aforementioned formulas (219) and (220), m1(X, X^) is an arbitrary positive definite function. As a result of calculations made by the computer, it is possible to find the positive definite symmetric solution P as described above. By using the aforementioned formulas (219) and (220), the aforementioned formulas (214) and (215) are respectively converted into formulas (221) and (222) shown below.

$$X_k'=(A+L_1C_2)X_k+(B_2(X_p)+L_1D_{p2}(X_p))u-L_1y \quad (221)$$

$$u=-D_{12}^{-1}((1+m1(X_p, X_k)X_k^T C_{11}^T C_{11} X_k)\times D_{12}^{-T}B_2^T(X_p)P+C_{12})X_k \quad (222)$$

Consequently, also in this case, a solution can easily be found by means of a known software in the same manner as in the case of the aforementioned state feedback control system. Therefore, this method makes it possible to easily find the positive definite symmetric solution P and to derive the state quantity X' and the control rule u=k(y).

d2. Calculation Example of Third Modification

Next, a calculation example of the first target damping force Fd using the control rule of the Kalman filter base will be described. The construction in this case is also the same as that of the first type of the aforementioned second modification.

Also in this case, the execution of the first damping force calculating routine is started in step 200, and processings of steps 202a, 204a and 210a which are substantially identical to those of the first type of the aforementioned second modification example are performed. However in this case, a state quantity $X_k'$ and a control input u are calculated in step 210a substantially in the same manner as in the case of the first type of the aforementioned second modification example, using after-mentioned formulas (223) and (224) which are identical to the aforementioned formulas (221) and (222) respectively.

$$X_k'=(A+L_1C_2)X_k+(B_2(X_p)+L_1D_{p2}(X_p))u-L_1y \quad (223)$$

$$u=D_{12}^{-1}((1+m1(X_p, X_k)X_k^T C_{11}^T C_{11} X_k)\times D_{12}^{-T}B_2^T(X_p)P+C_{12})X_k \quad (224)$$

In the aforementioned formula (223), A is a constant matrix that is preliminarily stored in the microcomputer and determined by the aforementioned formulas (198), (185), (30) and (47). $L_1$ is a constant matrix that is preliminarily stored in the microcomputer and defined by the aforementioned formulas (200), (191) and (192), and is a gain of the observer determined by the positive definite symmetric matrix Q, the constant matrix $C_p$, the constant matrix $C_2$ determined by the aforementioned formulas (39) and (111), and the positive definite matrix Θ. $C_2$ is also the aforementioned constant matrix that is preliminarily stored in the microcomputer. $B_2(X_p)$ is a constant matrix that is determined by the aforementioned formulas (199), (32) and (47). $D_{p2}(X_p)$ is a constant matrix that is determined by the aforementioned formula (38). Further, y is an observed value and represents the relative displacement amount ($X_{pw}-X_{pb}$) inputted through the aforementioned processing of step 202a and the sprung mass speed $X_{pb}'$ calculated through the aforementioned processing of step 204a.

In the aforementioned formula (224), $D_{12}$ is a coefficient matrix that is defined by the aforementioned formula (204) and relates to the frequency weight $W_u(S)$ set by the aforementioned formula (48), and is a constant matrix that is preliminarily stored in the microcomputer. $m1(X_p, X_k)$ is an arbitrary positive definite function and an algorithm concerning the function is preliminarily stored in the microcomputer. This positive definite function ml ($X_p, X_k$) may be set to a positive constant, for example, "1.0". $C_{11}$ is a constant matrix that is defined by the aforementioned formula (202), prescribed by the coefficient matrices $C_w$, $D_w$ and $C_s$ relating to the frequency weight $W_s(S)$ set in the aforementioned formula (185), and preliminarily stored in the microcomputer. $B_2(X_p)$ is a constant matrix that is determined by the aforementioned formulas (199), (32) and (47). P is a positive definite symmetric solution satisfying the aforementioned formula (211) and is a constant matrix that is preliminarily stored in the microcomputer. $C_{12}$ is a constant matrix which is preliminarily stored in the microcomputer and which includes the coefficient matrix $C_u$ that is prescribed by the aforementioned formula (203) and relates to the frequency weight $W_u(S)$ set in the aforementioned formula (48).

After the processing of the aforementioned step 210a, through processings of the same steps 212 and 214 as in the first modification and the first type of the second modification, an overall target damping coefficient $C_s$ of the damper 12 and a first target damping force Fd are calculated. In step 216, the execution of the first damping force calculating routine is terminated.

e. Other Modification

In the aforementioned first through third modifications, the tire displacement amount ($X_{pr}-X_{pw}$), the relative displacement amount ($X_{pw}-X_{pb}$), the unsprung mass speed $X_{pw}'$ and the sprung mass speed $X_{pb}'$ are used as a state quantity in the state space expression of the generalized model. However, as long as the aforementioned state space expression is possible, other physical quantities concerning vertical movements of the vehicle body BD and the wheel WH can also be utilized. Further, in the first type of the aforementioned second modification and the third modification, the estimation is carried out without detecting the tire displacement amount ($X_{pr}-X_{pw}$) or the unsprung mass speed $X_{pw}'$. In the second and third types of the aforementioned second modification, the estimation is carried out even without detecting the relative displacement amount ($X_{pw}-X_{pb}$) (the relative speed ($X_{pw}'-X_{pb}'$)). However, through a slight modification on the control side, the estimation can also be carried out without detecting other state variables.

In the aforementioned first through third modifications, three physical quantities, namely, the sprung mass speed $X_{pb}'$ which affects resonance of the vehicle body BD, the relative speed ($X_{pw}'-X_{pb}'$) which affects resonance of the wheel WH, and the sprung mass acceleration $X_{pb}''$ which affects a deterioration in riding comfort (a feeling of cragginess) of the vehicle are used as the evaluated output $Z_p$. However, it is also possible to use one or two of these physical quantities as the evaluated output $Z_p$.

In addition, as a quantity affecting resonance of the vehicle body BD, physical quantities closely associated with movements of the vehicle body BD such as the sprung mass acceleration $X_{pb}''$ and the sprung mass displacement amount $X_{pb}$ may be used instead of the sprung mass speed $X_{pb}'$. As a quantity affecting resonance of the wheel WH, physical quantities closely associated with movements of the wheel WH such as the unsprung mass speed $X_{pw}'$ and the tire displacement amount ($X_{pr}-X_{pw}$) may be used instead of the relative speed ($X_{pw}'-X_{pb}'$).

In the aforementioned various modifications, the non-linear H∞ control theory is applied as a control theory which can handle a non-linear model and provide a design specification in the form of a frequency range. However, as the control theory, the bilinear matrix inequality control theory, which is an extended version of the linear matrix inequality control theory, may be employed.

The aforementioned various modifications realize a good damping force control device which satisfies the control specification (the norm condition) that is given at the time of designing, has a control input (the non-linear damping coefficient $C_v$) that changes continuously, and performs control without causing a sense of incongruity, also in the bilinear control system handling the first target damping force Fd=$C_s$ ($X_{pw}'-X_{pb}'$), which is given as a product of the speed ($X_{pw}'-X_{pb}'$) of the wheel WH (the unsprung mass member) relative to the vehicle body BD (the sprung mass member) and the damping coefficient $C_s$ that changes in accordance with the relative speed ($X_{pw}'-X_{pb}'$). Further in the aforementioned various modification examples, the first target damping force Fd is calculated by considering a generalized model which employs, as an evaluated output, the vertical speed $X_{pb}'$ of the vehicle body BD which affects resonance of the vehicle body BD, the speed ($X_{pw}'-X_{pb}'$) of the wheel WH relative to the vehicle body BD which affects resonance of the wheel WH, and the vertical acceleration $X_{pb}''$ of the vehicle body BD which affects a deterioration in riding comfort (a feeling of cragginess). Predetermined frequency weights are then attributed to the vertical speed $X_{pb}'$, the relative speed ($X_{pw}'-X_{pb}'$) and the vertical acceleration $X_{pb}''$. Therefore it is possible to control, in accordance with a frequency range, the vertical speed $X_{pb}'$, the relative speed ($X_{pw}'-X_{pb}'$) and the vertical acceleration $X_{pb1}'$ in such a manner as to more effectively inhibit the vehicle from being adversely affected. Hence, these various modifications achieve calculation of a first target damping force Fd which improves running stability and riding comfort of the vehicle.

As shown in FIG. 1, the electronic control device is preferably implemented on a general purpose computer. However, the electronic control device can also be implemented on a special purpose computer, a programmed microprocessor or microcontroller and peripheral integrated circuit elements, on ASIC or other integrated circuit, a digital signal processor, a hardwired electronic or logic circuit such as a discrete element circuit, a programmable logic device such as a PLD, PLA, FPGA or PAL, or the like. In general, any device capable of implementing a finite state machine that is in tarn capable of implementing the flowcharts shown in FIGS. 2, 3, 5, 7, 15 and 17, can be used to implement the electronic control device.

While the invention has been described with reference to what are presently considered to be preferred embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the invention.

What is claimed is:

1. A damping force control device for controlling damping forces of dampers disposed between a vehicle body and respective wheels of a vehicle, comprising a controller that:
   calculates, for each of the wheels, a first target damping force that inhibits vibrations of the vehicle body in a heave direction, based on a single wheel model of the vehicle;
   calculates, for each of the wheels, a second target damping force that inhibits vibrations of the vehicle body in a pitch direction, based on a model of front and rear wheels of the vehicle;
   determines an ultimate target damping force for each of the wheels, based on the calculated first and second target damping forces; and
   outputs a control signal corresponding to the determined ultimate target damping force to each of the dampers such that a damping force exerted by each of the dampers is set to the determined ultimate target damping force.

2. The damping force control device according to claim 1, wherein the controller:
   calculates the first target damping force in accordance with a vertical kinetic state quantity of the vehicle body; and
   calculates the second target damping force in accordance with a kinetic state quantity of the vehicle body in the pitch direction.

3. The damping force control device according to claim 1, wherein the controller:
   determines the ultimate target damping force by selecting the greater one of the calculated first and second target damping forces for each of the wheels.

4. The damping force control device according to claim 3, wherein the controller:
   calculates the first target damping force in accordance with a vertical kinetic state quantity of the vehicle body; and
   calculates the second target damping force in accordance with a kinetic state quantity of the vehicle body in the pitch direction.

5. The damping force control device according to claim 1, wherein the controller:
   judges a relation in degree of magnitude of absolute values of the first and second target damping forces;
   weights the target damping force of the greater absolute value with a greater weight; and
   summatively synthesizes the respectively weighted first and second target damping forces, and thereby determines the ultimate target damping force.

6. A damping force control device for controlling damping forces of dampers disposed between a vehicle body and respective wheels of a vehicle, comprising a controller that:
   calculates, for each of the wheels, a first target damping force that inhibits vibrations of the vehicle body in a heave direction, based on a single wheel model of the vehicle;
   calculates, for each of the wheels, a second target damping force that inhibits vibrations of the vehicle body in a roll direction, based on a model of left and right wheels of the vehicle;
   determines an ultimate target damping force for each of the wheels, based on the calculated first and second target damping forces; and
   outputs a control signal corresponding to the determined ultimate target damping force to each of the dampers such that a damping force exerted by each of the dampers is set to the determined ultimate target damping force.

7. The damping force control device according to claim 6, wherein the controller:
   calculates the first target damping force in accordance with a vertical kinetic state quantity of the vehicle body; and
   calculates the second target damping force in accordance with a kinetic state quantity of the vehicle body in the roll direction.

8. The damping force control device according to claim 6, wherein the controller:
   determines the ultimate target damping force by selecting the greater one of the calculated first and second target damping forces for each of the wheels; and
   outputs the selected control signal to each of the dampers such that the damping force exerted by each of the dampers is set to the selected target damping force.

9. The damping force control device according to claim 8, wherein the controller:
   calculates the first target damping force in accordance with a vertical kinetic state quantity of the vehicle body; and
   calculates the second target damping force in accordance with a kinetic state quantity of the vehicle body in the roll direction.

10. The damping force control device according to claim 6, wherein the controller:
   judges a relation in degree of magnitude of absolute values of the first and second target damping forces;
   weights the target damping force of the greater absolute value with a greater weight; and
   summatively synthesizes the respectively weighted first and second target damping forces, and thereby determines the ultimate target damping force.

11. A damping force control device for controlling damping forces of dampers disposed between a vehicle body and respective wheels of a vehicle, comprising a controller that:
   calculates, for each of the wheels, a first target damping force that inhibits vibrations of the vehicle body in a heave direction, based on a single wheel model of the vehicle;
   calculates, for each of the wheels, a second target damping force that inhibits vibrations of the vehicle body in a pitch direction, based on a model of front and rear wheels of the vehicle;
   calculates, for each of the wheels, a third target damping force that inhibits vibrations of the vehicle body in a roll direction, based on a model of left and right wheels of the vehicle;
   determines an ultimate target damping force for each of the wheels, based on the calculated first, second and third target damping forces;
   outputs a control signal corresponding to the determined ultimate target damping force to each of the dampers such that a damping force exerted by each of the dampers is set to the determined ultimate target damping force.

12. The damping force control device according to claim 11, wherein the controller:
   calculates the first target damping force in accordance with a vertical kinetic state quantity of the vehicle body;
   calculates the second target damping force in accordance with a kinetic state quantity of the vehicle body in the pitch direction; and
   calculates the third target damping force in accordance with a kinetic state quantity of the vehicle body in the roll direction.

13. The damping force control device according to claim 11, wherein the controller:
   selects the greatest one of the calculated first, second and third target damping forces for each of the wheels; and
   outputs a control signal corresponding to the selected target damping force to each of the dampers and performs control such that the damping force exerted by each of the dampers is set to the selected target damping force.

14. The damping force control device according to claim 13, wherein the controller:
   calculates the first target damping force in accordance with a vertical kinetic state quantity of the vehicle body;
   calculates the second target damping force in accordance with a kinetic state quantity of the vehicle body in the pitch direction; and
   calculates the third target damping force in accordance with a kinetic state quantity of the vehicle body in the roll direction.

15. The damping force control device according to claim 11, wherein the controller:
   judges a relation in degree of magnitude of absolute values of the first, second and third target damping forces;
   increases weights with which the target damping forces are weighted as the absolute values increase; and
   summatively synthesizes the respectively weighted first, second and third target damping forces, and thereby determines the ultimate target damping force.

16. The damping force control device according to claim 11, wherein the controller:
   judges a relation in degree of magnitude of absolute values of the first, second and third target damping forces;

chooses the target damping forces of the greatest two absolute values; and summatively synthesizes the chosen target damping forces, and thereby determines the ultimate target damping force.

17. The damping force control device according to claim 11, wherein the controller:

judges a relation in degree of magnitude of absolute values of the first, second and third target damping forces;

chooses the target damping forces of the greatest two absolute values;

weights one of the chosen target damping forces that has the greater absolute value with a greater weight; and summatively synthesizes the chosen target damping forces, and thereby determines the ultimate target damping force.

18. A damping force control method for controlling damping forces of dampers disposed between a vehicle body and respective wheels of a vehicle, comprising:

calculating, for each of the wheels, a first target damping force that inhibits vibrations of the vehicle body in a heave direction, based on a single wheel model of the vehicle;

calculating, for each of the wheels, a second target damping force that inhibits vibrations of the vehicle body in a pitch direction, based on a model of front and rear wheels of the vehicle;

determining an ultimate target damping force for each of the wheels, based on the calculated first and second target damping forces; and outputting a control signal corresponding to the determined ultimate target damping force to each of the dampers such that a damping force exerted by each of the dampers is set to the determined ultimate target damping force.

19. A damping force control method for controlling damping forces of dampers disposed between a vehicle body and respective wheels of a vehicle, comprising:

calculating, for each of the wheels, a first target damping force that inhibits vibrations of the vehicle body in a heave direction, based on a single wheel model of the vehicle;

calculating, for each of the wheels, a second target damping force that inhibits vibrations of the vehicle body in a roll direction, based on a model of left and right wheels of the vehicle;

determining an ultimate target damping force for each of the wheels, based on the calculated first and second target damping forces; and outputting a control signal corresponding to the determined ultimate target damping force to each of the dampers such that a damping force exerted by each of the dampers is set to the determined ultimate target damping force.

20. A damping force control method for controlling damping forces of dampers disposed between a vehicle body and respective wheels of a vehicle, comprising:

calculating, for each of the wheels, a first target damping force that inhibits vibrations of the vehicle body in a heave direction, based on a single wheel model of the vehicle;

calculating, for each of the wheels, a second target damping force that inhibits vibrations of the vehicle body in a pitch direction, based on a model of front and rear wheels of the vehicle;

calculating, for each of the wheels, a third target damping force that inhibits vibrations of the vehicle body in a roll direction, based on a model of left and right wheels of the vehicle;

determining an ultimate target damping force for each of the wheels, based on the calculated first, second and third target damping forces; and outputting a control signal corresponding to the determined ultimate target damping force to each of the dampers such that a damping force exerted by each of the dampers is set to the determined ultimate target damping force.

* * * * *